United States Patent
Itou et al.

(10) Patent No.: US 7,947,406 B2
(45) Date of Patent: May 24, 2011

(54) POLYMER ELECTROLYTE, MEMBRANE/ELECTRODE ASSEMBLY, AND FUEL CELL

(75) Inventors: Takayuki Itou, Minami-ashigara (JP);
Yuushi Kaneko, Kaisei-machi (JP);
Wataru Kikuchi, Kaisei-machi (JP)

(73) Assignee: FUJIFILM Corporation, Tokyo (JP)

( * ) Notice: Subject to any disclaimer, the term of this patent is extended or adjusted under 35 U.S.C. 154(b) by 1060 days.

(21) Appl. No.: 11/692,360

(22) Filed: Mar. 28, 2007

(65) Prior Publication Data
US 2007/0231652 A1  Oct. 4, 2007

(30) Foreign Application Priority Data
Mar. 31, 2006  (JP) .................. 2006-098697

(51) Int. Cl.
*H01M 8/10* (2006.01)
(52) U.S. Cl. ........ 429/479; 429/480; 429/482; 429/483; 429/484; 429/491; 429/523; 521/25
(58) Field of Classification Search ............ 429/479, 429/480, 482, 483, 484, 491, 523; 521/25
See application file for complete search history.

(56) References Cited

FOREIGN PATENT DOCUMENTS
JP   2006-310159   * 11/2006
* cited by examiner

*Primary Examiner* — Laura S Weiner
(74) *Attorney, Agent, or Firm* — Sughrue Mion, PLLC

(57) ABSTRACT

A polymer electrolyte having a repetitive structure represented by the following formula (1):

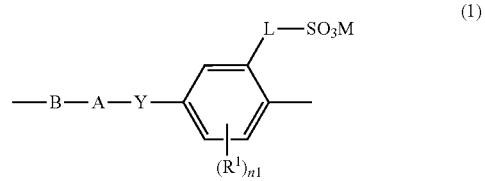

wherein B represents a single bond or a bivalent group, A represents a bivalent aromatic group, Y represents $-SO_2-$, $-SO-$ or $-CO-$, $R^1$ represents a substituent, $n1$ represents an integer of from 0 to 3, L represents a perfluoroalkylene group, and M represents an ionic group.

10 Claims, 1 Drawing Sheet

POLYMER ELECTROLYTE, MEMBRANE/ELECTRODE ASSEMBLY, AND FUEL CELL

BACKGROUND OF THE INVENTION

1. Field of the Invention

The present invention concerns a polymer electrolyte, particularly a polymer electrolyte having a proton conductivity ability and, a membrane/electrode assembly, and a fuel cell.

2. Description of the Related Art

In recent years, lithium ion cells and fuel cells that can be utilized as power sources for portable equipments, etc. have been studied vigorously and, also for polymer electrolytes such as lithium ion conductive material, and proton conductive materials as members thereof have also been studied vigorously.

Further, it is preferred that a power source is a small size when the power is identical. Particularly, the fuel cells have been studied vigorously since they have advantageous features that they are quiet and exhaust gases are clean for internal combustion engines such as engines, as well as it has a possibility of providing high energy efficiency excellent over the internal combustion engines.

Generally, while sulfonic acid group containing perfluorocarbon polymers typically represented by Nafion (registered trade mark) have been used as the proton conductive material, since the materials have high ion conductivity but permeate also highly polar organic solvents such as methanol, the power is low in direct methanol type fuel cells. Further, for suppressing the permeation of methanol, only the aqueous methanol solution at a low concentration of about several % can be used as fuels, so that the energy density per unit weight or unit volume is lowered to result in a problem such that they cannot be applied to small-sized portable equipment uses. Further, it has also been demanded for a strength suitable to the process of manufacturing membrane/electrode assemblies and a sufficient durability in a case of use as fuel cells.

In recent years, there are many examples for the development of polymer electrolytes using highly rigid polymer materials and, studies have been made so far on the polymer electrolytes using resin materials of high solvent resistance among the polymer materials and polymer electrolytes mainly comprising sulfonated polyether ether ketone, sulfonated polysulfone, and sulfonated polyether ketone have been developed as disclosed in JP-A Nos. 6-49202, 6-93114, 8-20716, 9-245818, and 10-21943. However, since the sulfonic acid group is connected by way of a single bond to the aromatic ring of the polymer main chain, it involves a problem that sulfonic acid groups gradually cause dissociation at a high operation temperature to lower the cell performance. Further, also the proton conductivity is not at a sufficiently satisfactory level.

For solving the problems described above, polymer electrolytes in which sulfonic acid groups are introduced by way of a fluorinated alkylene group to aromatic rings of polymer main chains have been developed in JP-A Nos. 2004-2596, and 2005-314452. However, also the polymer electrolytes described above still leave a room for improvement with a view point of proton conductivity and durability and it has been demanded for further improvement of such performance intended for the practical use of the polymer electrolyte, particularly, a proton conductive film of a solid polymer fuel cell.

SUMMARY OF THE INVENTION

The present invention intends to solve the foregoing problems and provide a polymer electrolyte having high ion conductivity and durability.

The present inventors have made an earnest study and, as a result, have found that a polymer electrolyte having a specific sulfonic acid-containing aromatic repetitive structure as described below is extremely effective for overcoming the problems described above to accomplish the invention.

(1) A polymer electrolyte having a repetitive structure represented by the following formula (1):

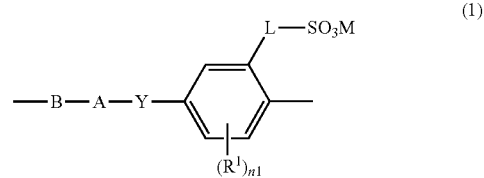

wherein B represents a single bond or a bivalent group, A represents a bivalent aromatic group, Y represents —$SO_2$—, —SO— or —CO—, $R^1$ represents a substituent, n1 represents an integer of from 0 to 3, L represents a perfluoroalkylene group, and M represents an ionic group.

(2) A polymer electrolyte according to (1) described above wherein in the formula (1) B represents an oxygen atom, sulfur atom or a bivalent group selected from the group consisting of the following formulae ($B_1$), ($B_2$) and ($B_3$), and A represents a bivalent aromatic group selected from the group consisting of the following formulae ($A_1$) and ($A_2$):

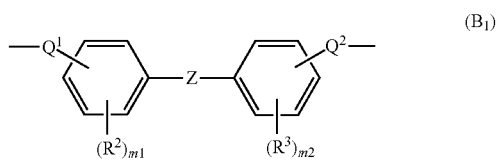

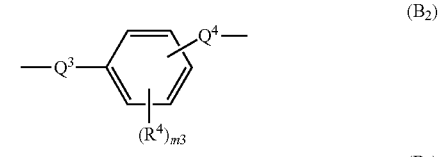

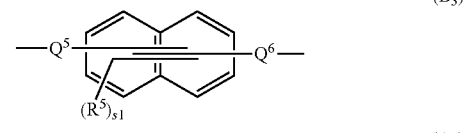

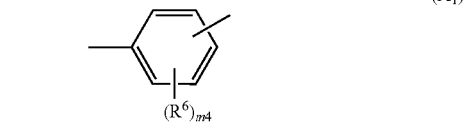

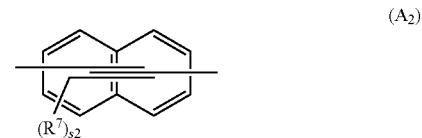

wherein Z represents a single bond or a bivalent group, $Q^1$, $Q^2$, $Q^3$, $Q^4$, $Q^5$, and $Q^6$ each represents independently a single bond, an oxygen atom or sulfur atom, $R^2$, $R^3$, $R^4$, $R^5$, $R^6$, and $R^7$ each represents independently a substituent, m1, m2, m3 and m4 each represents independently an integer of from 0 to 4, and s1 and s2 each represents independently an integer of from 0 to 6.

(3) A polymer electrolyte according to (1) or (2) described above, wherein in the formula (1), L is a perfluoroalkylene group having an etheric bond.

(4) A polymer electrolyte according to any one of (1) to (3) described above, which is in a film-like shape.

(5) A membrane/electrode assembly comprising a polymer electrolyte according to any one of (1) to (4) described above, and a gas diffusion electrode including a cathode electrode and an anode electrode disposed on both sides by way of the polymer electrolyte.

(6) A membrane/electrode assembly according to (5) described above, wherein the gas diffusion electrode is an electrode in which fine particles of a catalyst metal are supported by a binder on the surface of a conductive material made of a carbon material.

(7) A membrane/electrode assembly according to (6) described above, wherein the binder is a hydrocarbon polymer electrolyte.

(8) A fuel cell comprising a membrane/electrode assembly according to any one of (5) to (7) described above.

(9) A fuel cell according to (8) described above further comprising a pair of gas impermeable separators disposed so as to sandwich the gas diffusion electrode therebetween.

(10) A fuel cell according to (9) described above, further comprising a pair of collectors disposed between the polymer electrolyte membrane and the separator.

A polymer electrolyte having high ion conductivity and hot water resistance can be provided.

DESCRIPTION OF THE ACCOMPANYING DRAWINGS

PREFERRED EMBODIMENTS OF THE INVENTION

Figure 1:
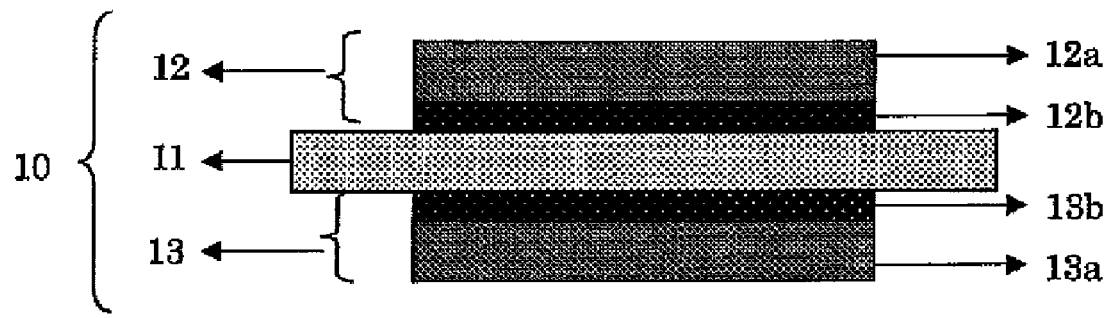
FIG. 1 is a schematic cross sectional view showing a constitution of a catalyst electrode joined film using a polymer electrolyte of the invention.

The present invention is to be described specifically. In the present specification " . . . to . . . " is used in the meaning of including numerical values described before and after "to" as a lower limit value and an upper limit value.

The polymer electrolyte of the invention has a repetitive structure represented by the formula (1).

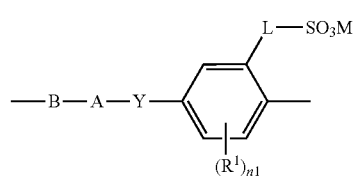

in the formula (1), B represents a single bond or a bivalent group. Preferred examples of the bivalent group are an oxygen atom, sulfur atom or groups represented by the following formulae ($B_1$) to ($B_3$).

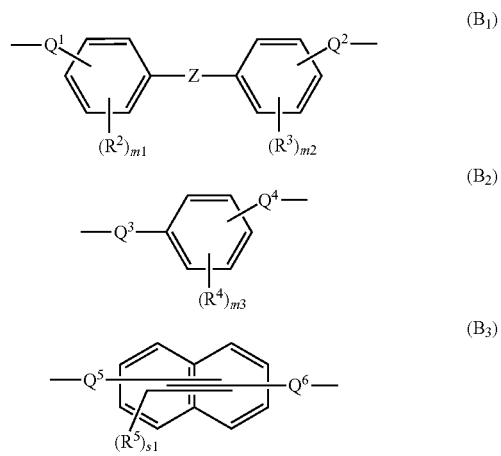

In the formulae ($B_1$) to ($B_3$), $Q^1$, $Q^2$, $Q^3$, $Q^4$, $Q^5$, and $Q^6$ each represents independently a single bond, an oxygen atom or sulfur atom, $R^2$, $R^3$, $R^4$, and $R^5$ each represents independently a substituent, m1, m2, and m3 each represents independently an integer of from 0 to 4, and s1 represents an integer of from 0 to 6.

The substituent represented by $R^2$ to $R^5$ has no particular restriction and includes, for examples, the following substituents. Halogen atoms (for example, fluorine atom, chlorine atom, bromine atom, and iodine atom), alkyl group of 20 or less carbon atoms (for example, methyl group and ethyl group), aryl group of 30 or less carbon atoms (for example, phenyl group and naphtyl group), cyano group, carboxyl group, alkoxycarbonyl group of 20 or less carbon atoms (for example, methoxy carbonyl group), aryloxycarbonyl group of 30 or less carbon atoms (for example, phenoxycarbonyl group), carbamoyl groups (for example, carbamoyl group, N-phenylcarbamoyl group, and N,N-dimethyl carbamoyl group), alkylcarbonyl group of 20 or less carbon atoms (for example, acetyl group), arylcarbonyl group of 30 or less carbon atoms (for example, benzoyl group), nitro group, amino group (for example, amino group, dimethylamino group, and anilino group), acylamino group of 20 or less carbon atoms (for example, acetoamide group and ethoxycarbonylamino group), sulfoneamide groups (for example, methanesulfoneamide group), imide group (for example, succineimide group, and phthalimide group), and imino group (for example, benzylidene amino group), hydroxyl group, alkoxy group of 20 or less carbon atoms (for example, methoxy group), aryloxy group of 30 or less carbon atoms (for example, phenoxy group), acyloxy group of 20 or less carbon atoms (for example, acetoxy group), alkylsulfonyloxy group of 20 or less carbon atoms (for example, methanesulfonyloxy group), arylsulfonyloxy group of 30 or less carbon atoms (for example, benzene sulfonyloxy group), sulfa group, sulfamoyl groups (for example, sulfamoyl group and N-phenylsulfamoyl group), alkylthio group of 20 or less carbon atoms (for example, methylthio group), arylthio group of 30 or less carbon atoms (for example, phenylthio group), alkylsulfonyl group of 20 or less carbon atoms (for example, methanesulfonyl group), arylsulfonyl group of 30 or less carbon atoms (for example, benzenesulfonyl group), and heterocyclic group.

The substituent described above may be further substituted with a substituent. Further, the substituents may be joined to each other to form a ring. Further, the alkyl group in the substituent may form an unsaturated bond at any position, and the unsaturation bond may also be utilized as a cross linking group after film formation. In the following description, the term "substituent" is to be used in the same meanings as those for the substituent described herein unless otherwise specified.

Unless specifically described, in a case where a plurality of structures represented by one specified reference in the formula shown in the invention are present, plural structures represented by one specified reference may be identical or different with each other. For example, in a case where the formula ($B_1$) has a plurality of substituents each represented by $R^2$, respective $R^2$ may be identical or different with each other.

In the formula ($B_1$), Z represents a single bond or a bivalent group. Preferred examples of the bivalent group are an oxygen atom, sulfur atom or groups represented by the following formulae ($Z_1$) to ($Z_5$)

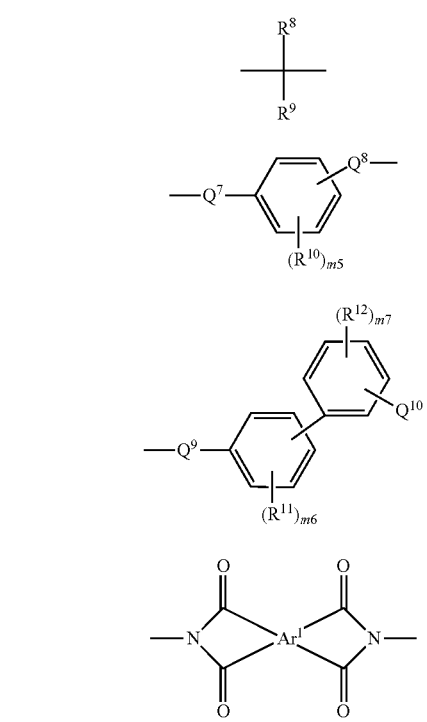

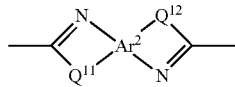

In the formula ($Z_1$), $R^8$ and $R^9$ each represents independently an alkyl group of 20 or less carbon atoms which may have a substituent (for example, methyl group, and trifluoromethyl group) or an aryl group of 30 or less carbon atoms (for example, phenyl group), which may have a substituent, $R^8$ and $R^9$ may join to form a ring. In the formulae ($Z_2$) and ($Z_3$), $Q^7$, $Q^8$, $Q^9$ and $Q^{10}$ each represents independently a single bond, an oxygen atom or sulfur atom, $R^{10}$, $R^{11}$, and $R^{12}$ each represents independently a substituent, m5, m6 and m7 each represents independently an integer of from 0 to 4. In the formulae ($Z_4$) and ($Z_5$), $Ar^1$ and $Ar^2$ each represents independently the group represented by the following formula.

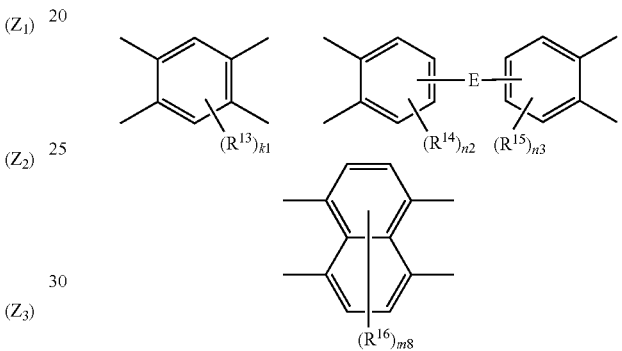

In the formula, $R^{13}$, $R^{14}$, $R^{15}$ and $R^{16}$ each represents independently a substituent, k1 represents an integer of from 0 to 2, n2 and n3 each represents independently an integer of from 0 to 3, m8 represents an integer of from 0 to 4, and E represents a single bond, an oxygen atom, sulfur atom, —$CH_2$—, —$C(CH_3)_2$—, —$C(CF_3)_2$—, —$SO_2$—, —SO— or —CO—.

In the formula ($Z_5$), $Q^{11}$ and $Q^{12}$ each represents independently an oxygen atom, sulfur atom, or —NH— and, preferably, $Q^{11}$ and $Q^{12}$ are identical with each other.

B is a group preferably represented by the formula ($B_1$) and, particularly, it is preferred that both of $Q^1$ and $Q^2$ are oxygen atoms, both of m1 and m2 are 0, and Z is a single bond or a group represented by $Z^1$, respectively.

Specific examples of the bivalent group represented by B are shown below but the invention is not restricted to them.

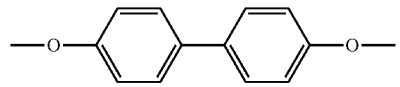
(B-1)

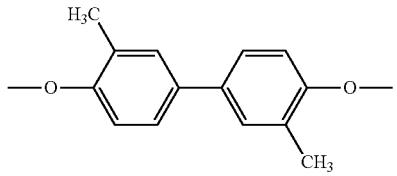
(B-2)

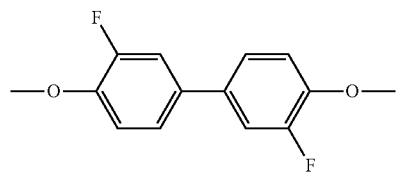
(B-3)

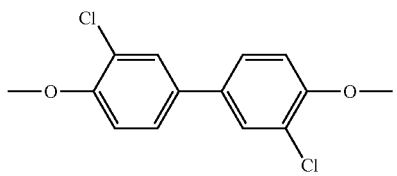
(B-4)

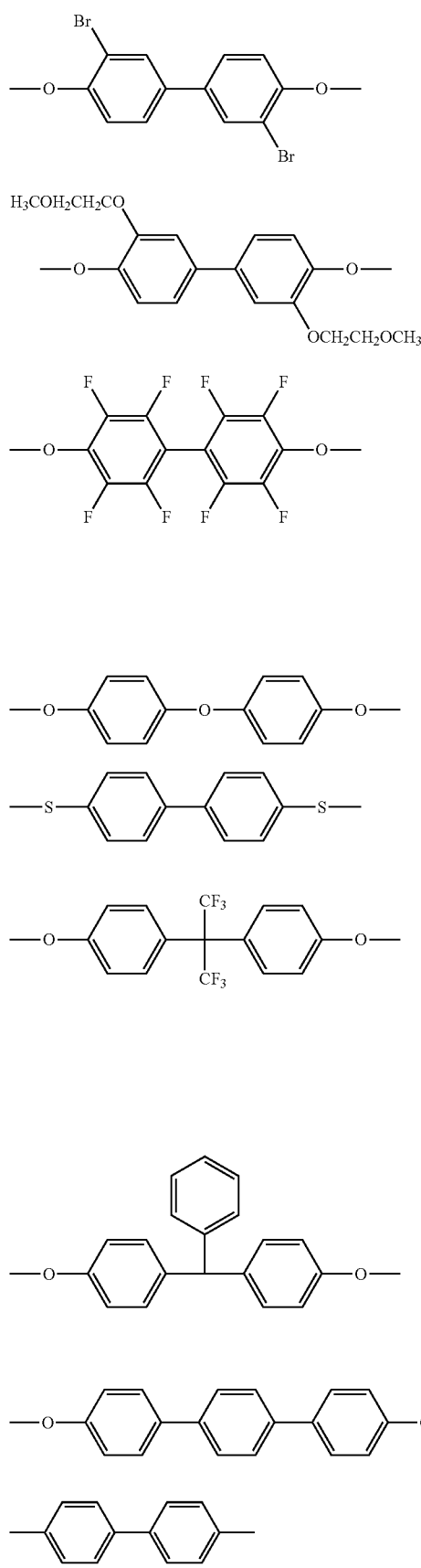

-continued
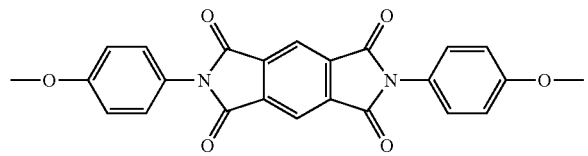
(B-23)
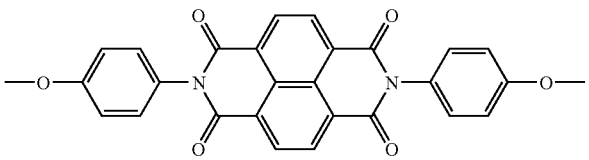
(B-24)
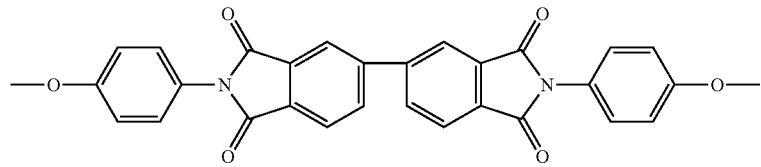
(B-25)
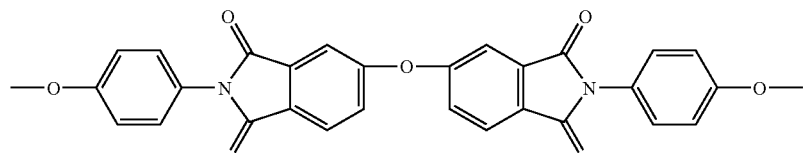
(B-26)
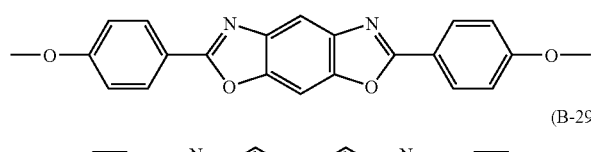
(B-27)
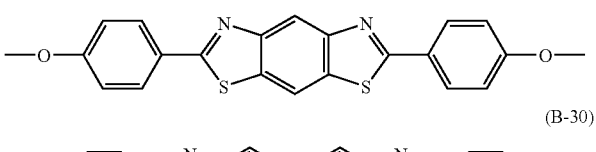
(B-28)
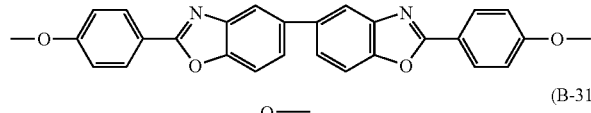
(B-29)
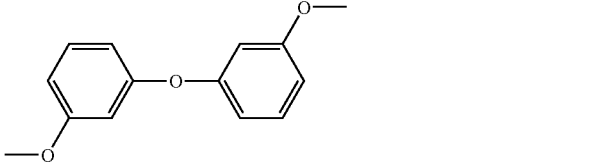
(B-30)
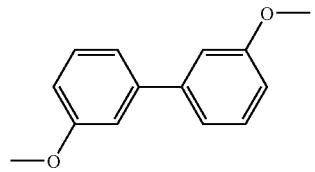
(B-31)
(B-32)
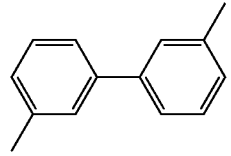
(B-33)
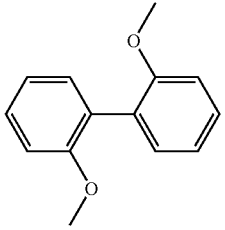
(B-34)
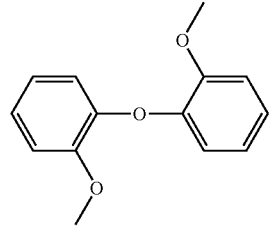
(B-35)
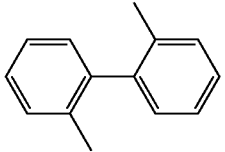
(B-36)
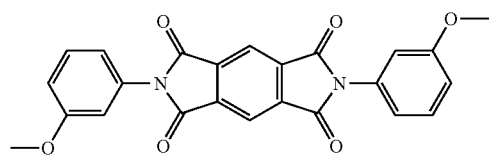
(B-37)
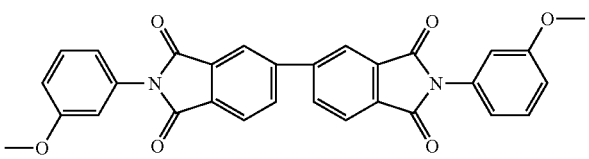
(B-38)

-continued
(B-39) 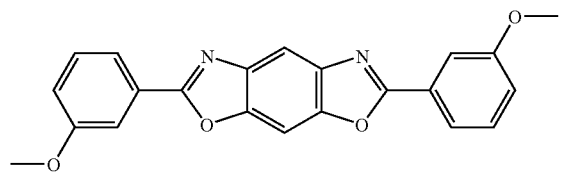
(B-40) 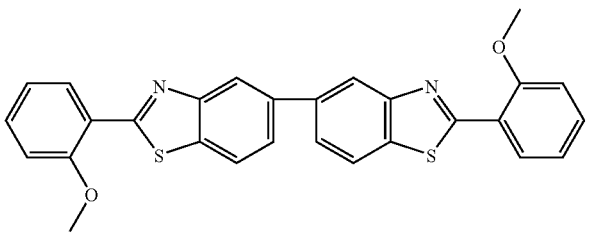
(B-41) 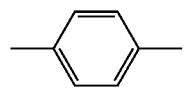
(B-42) 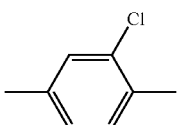
(B-43) 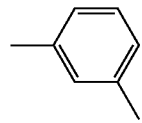
(B-44) 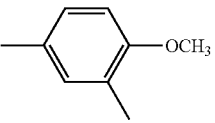
(B-45) 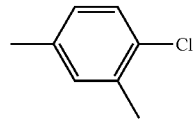
(B-46) 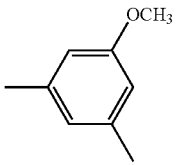
(B-47) 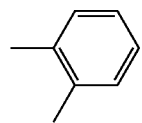
(B-48) 
(B-49) 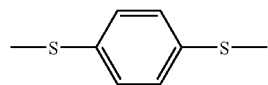
(B-50) 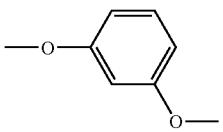
(B-51) 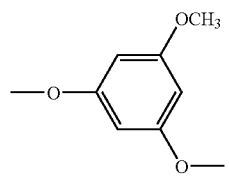
(B-52) 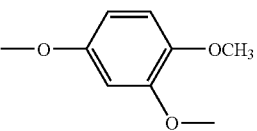
(B-53) 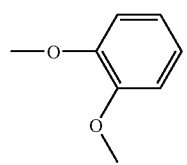
(B-54) 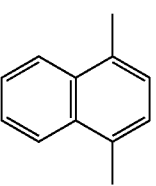
(B-55) 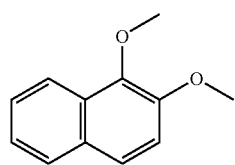
(B-56) 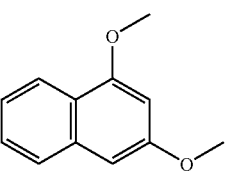

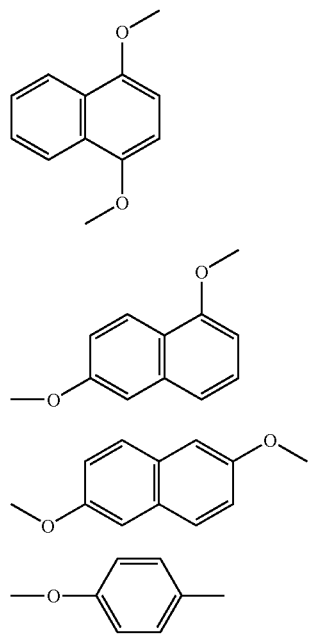

(B-57)

(B-58)

(B-59)

(B-60)

(B-61)

(B-62)

(B-63)

(B-64)

In the formula (1), A represents a bivalent aromatic group. Preferred examples of the bivalent aromatic group are those groups represented by the following formula $(A_1)$ or $(A_2)$.

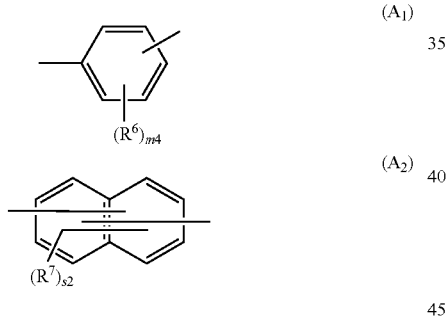

$(A_1)$ $(A_2)$

In the formula, $R^6$ and $R^7$ each represents independently a substituent, m4 represents an integer of from 0 to 4, s2 represents an integer of from 0 to 6. A is preferably a group represented by the formula $(A_1)$ and, more preferably, a p-phenylene group.

In the formula (1) Y is —$SO_2$—, —SO— or —CO—, and preferably, —$SO_2$— or —CO—.

In the formula (1), $R^1$ represents a substituent, and n1 represents an integer of from 0 to 3. Preferably n is 0.

L is a perfluoroalkylene group, which may have an etheric bond. Further, it is preferred that the alkylene group is branched or cyclic or is a linear chain of from 1 to 10 carbon atoms respectively. In this case, "may have an etheric bond" means that the alkylene group may contain an etheric bond at a portion thereof and L-8, and L-12 to L-14 of the specific examples for L to be described later correspond thereto. L more preferably contains the etheric bond to a portion of the alkylene group.

Specific examples of the group represented by L are to be shown below but the invention is not restricted to them.

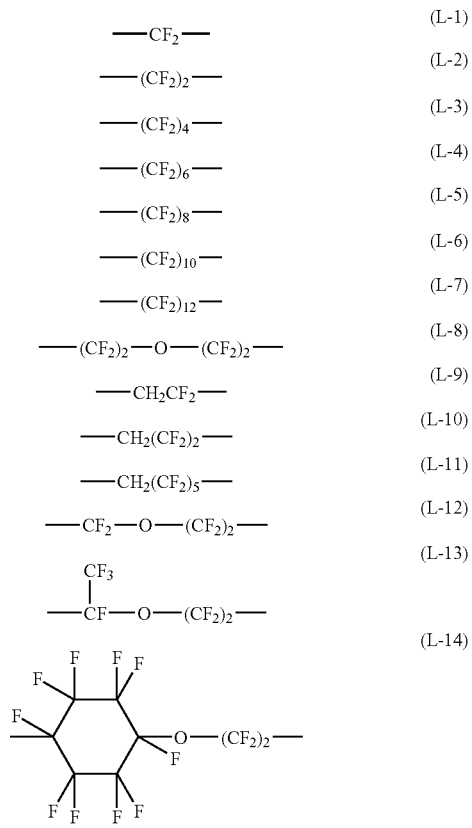

In the formula (1), M represents an ionic group, which is preferably selected from the group consisting of proton, alkali metal (lithium, sodium, and potassium) cations, alkaline earth metal (potassium, strontium and barium) cations, quaternary ammonium (trimethyl ammonium, triethyl ammonium, tributyl ammonium, and benzyltrimethyl ammonium)

cations, and protonation products of organic bases (triethylamine, pyridine, methylimidazol, morpholine, tributylammonium, and tris(2-hydroxyethyl)amine), and the proton is most preferred.

In a case where the formula (1) forms a salt, those in which a proton of the acid residue is replaced with cations are preferred and the substitution ratio (cation/acid residue ratio) is preferably within a range from 0 to 1. While it has no particular restriction in the course of the polymer synthesis, it is more preferably within a range from 0 to 0.1. As cations forming salts, alkali metal (lithium, sodium, and potassium) cations, alkaline earth metal (potassium, strontium and barium) cations, quaternary ammonium (trimethyl ammonium, triethyl ammonium, tributyl ammonium, and benzyltrimethyl ammonium) cations, and protonation products of organic bases (triethylamine, pyridine, methylimidazol, morpholine, tributylammonium, and tris(2-hydroxyethyl)amine) are preferred, alkali metal cations and ammonium cations are more preferred and, alkali metal cations are particularly preferred.

Specific examples of the repetitive structure represented by the formula (1) are to be shown below but the invention is not restricted to them.

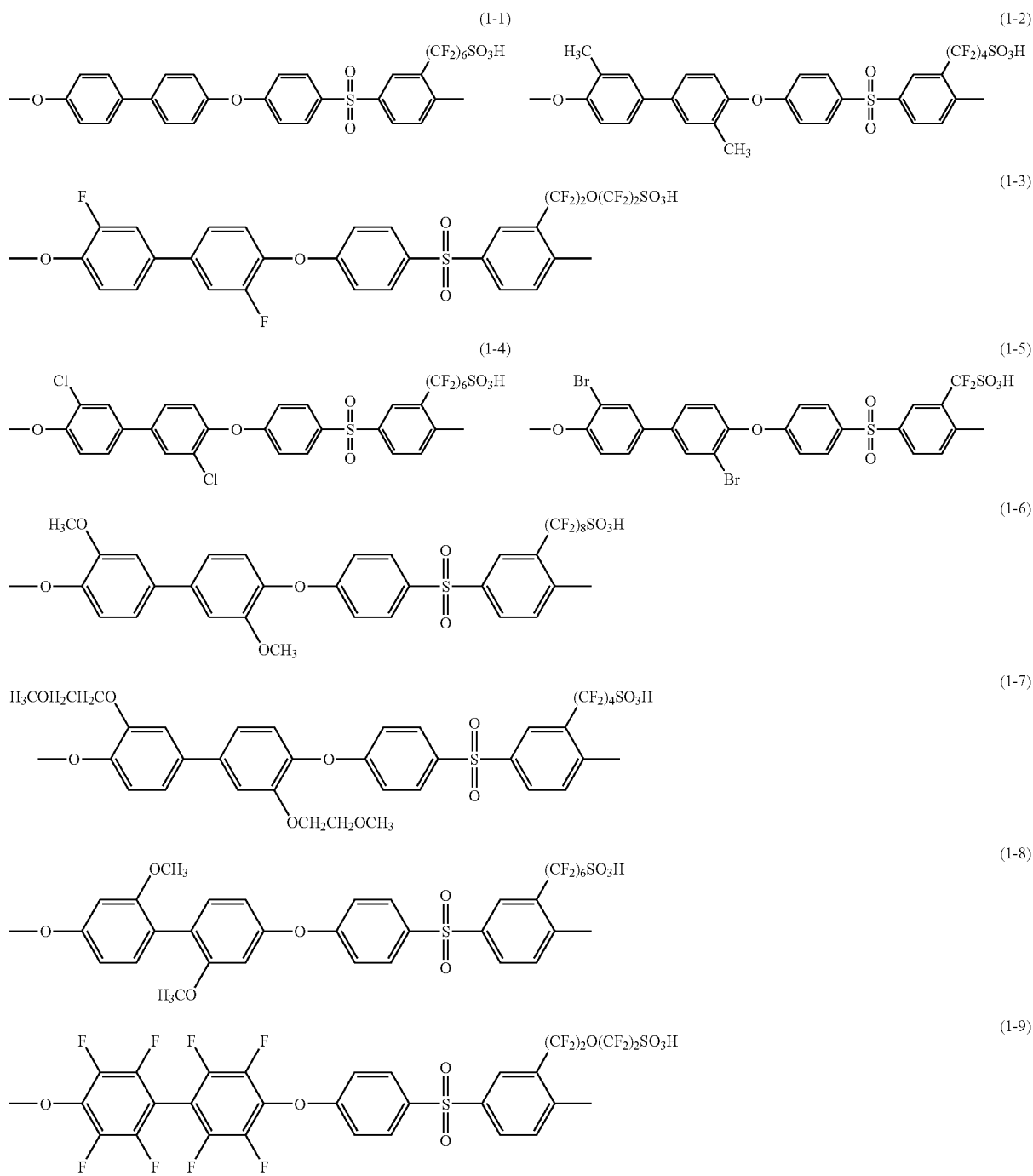

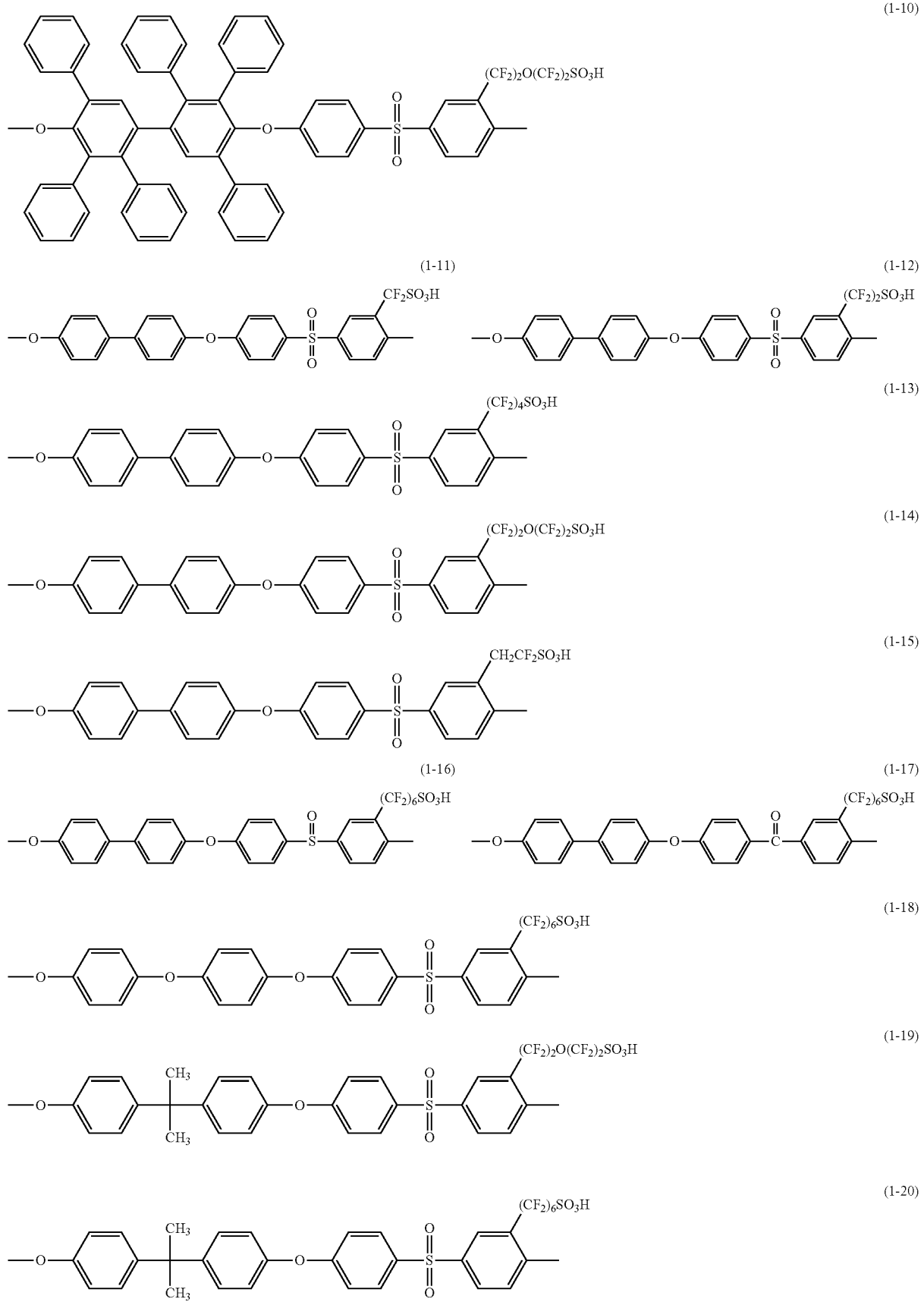

-continued
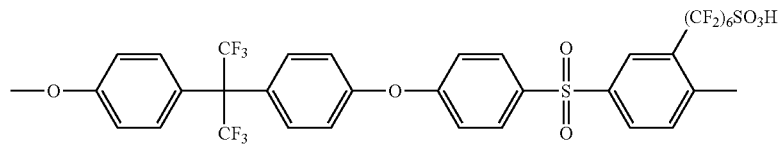
(1-21)
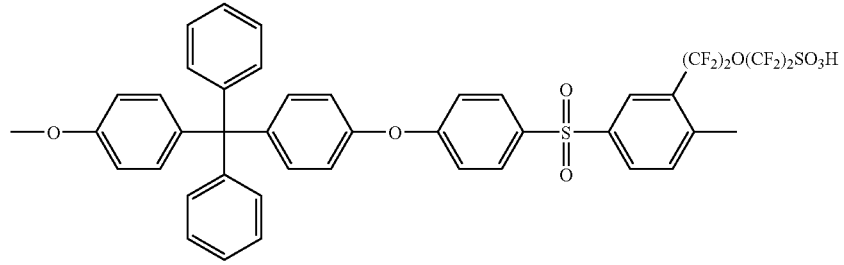
(1-22)
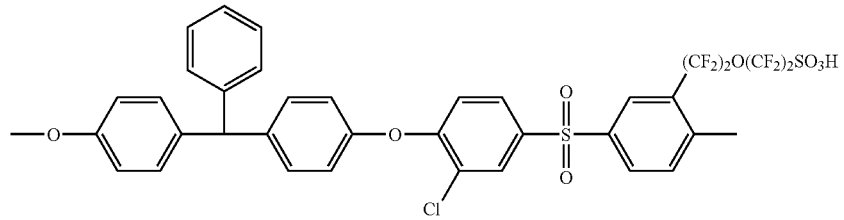
(1-23)
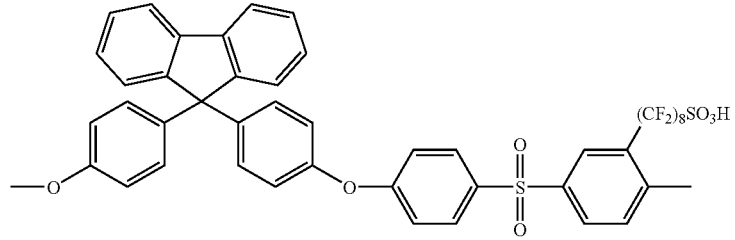
(1-24)
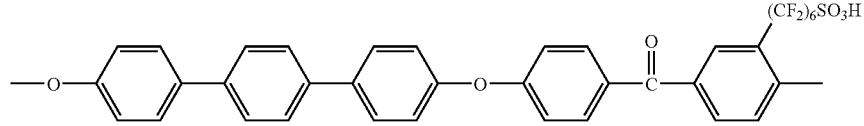
(1-25)
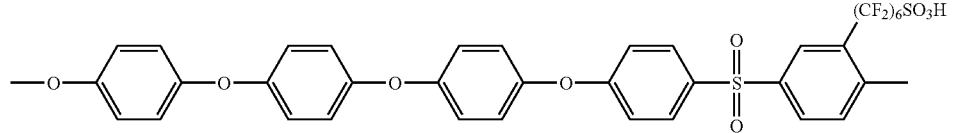
(1-26)
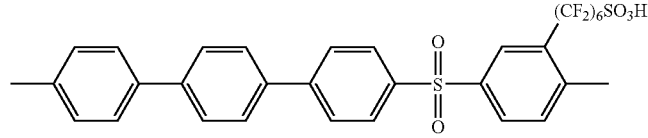
(1-27)
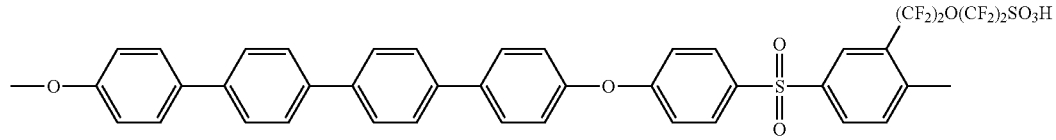
(1-28)

-continued
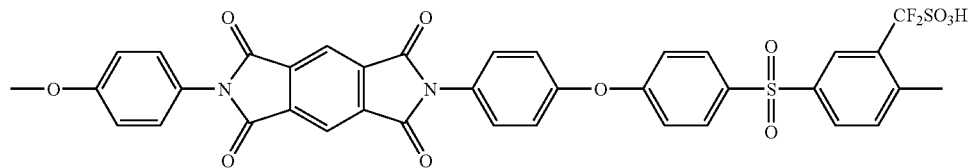
(1-29)
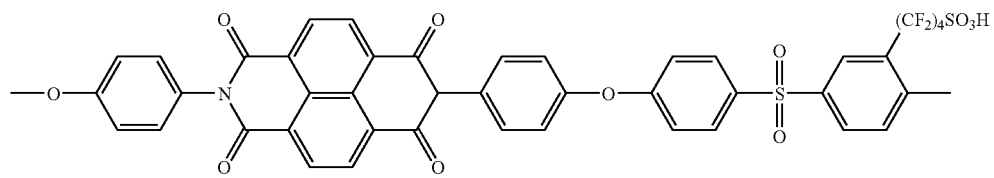
(1-30)
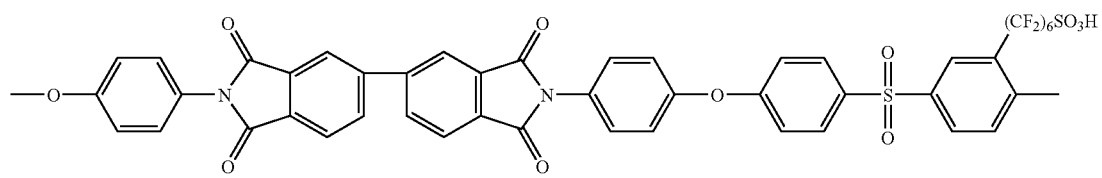
(1-31)
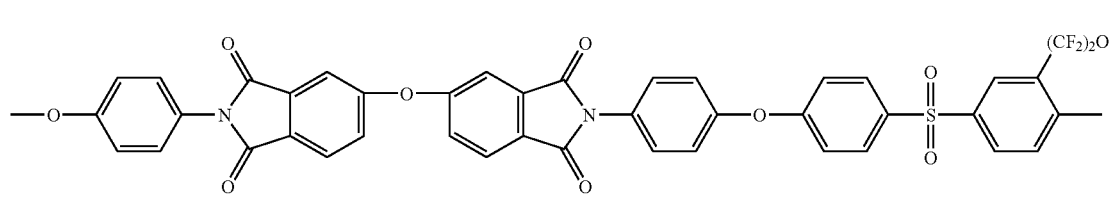
(1-32)
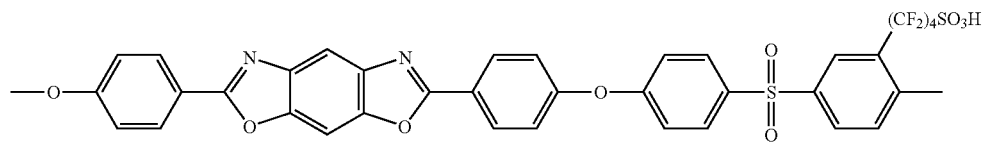
(1-33)
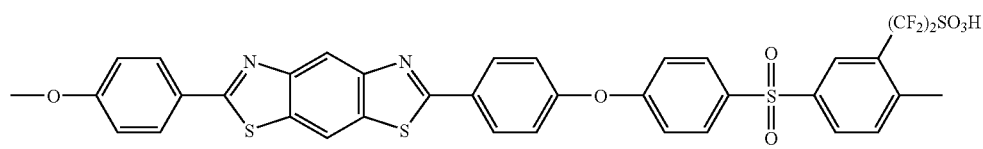
(1-34)
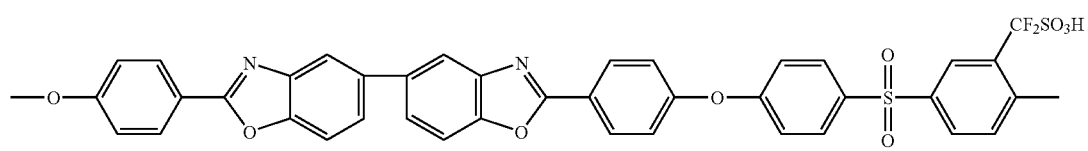
(1-35)
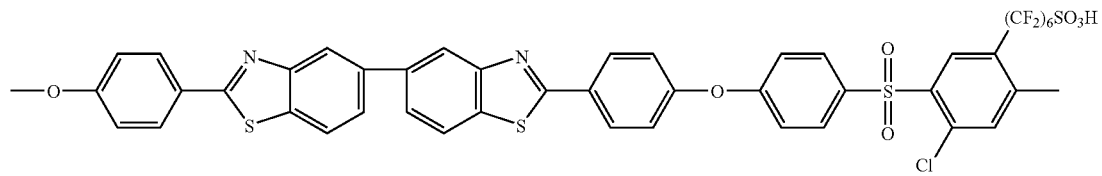
(1-36)
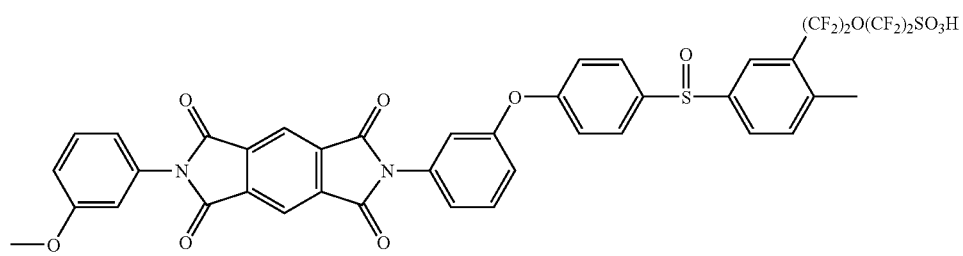
(1-37)

-continued
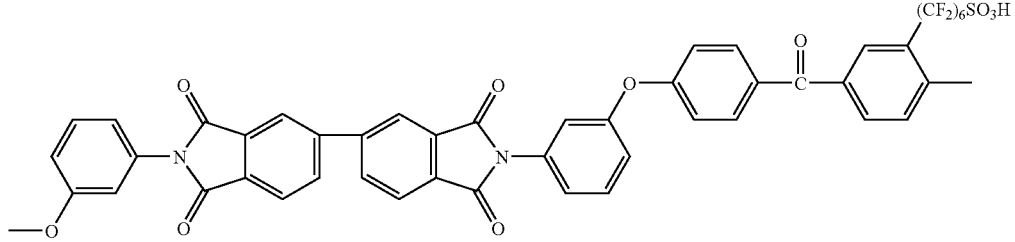
(1-38)
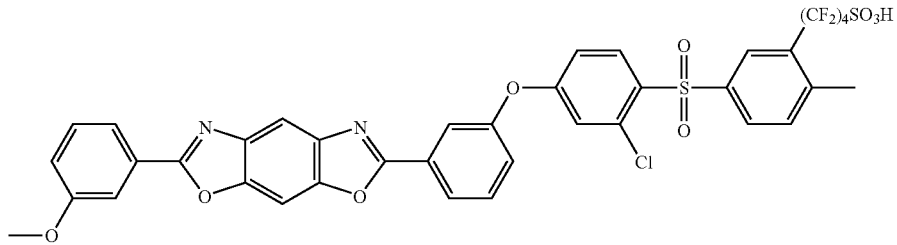
(1-39)
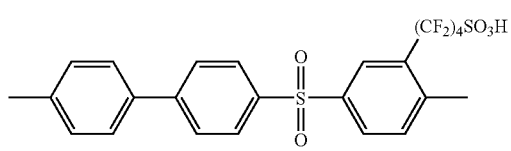
(1-40)
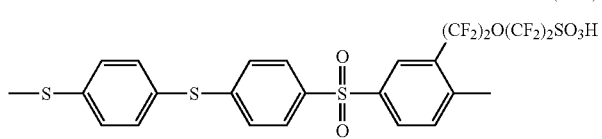
(1-41)
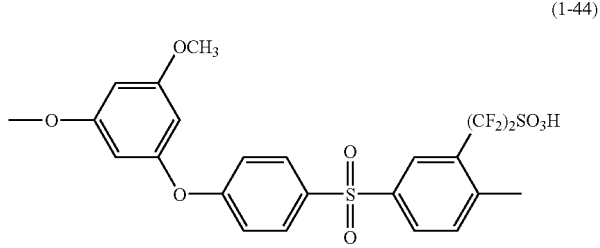
(1-42)
(1-43)
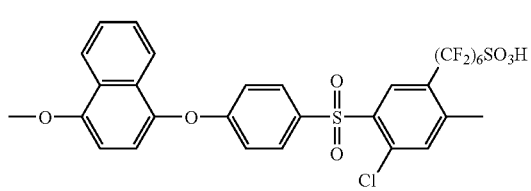
(1-44)
(1-45)
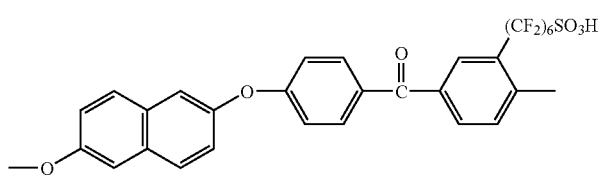
(1-46)
(1-47)
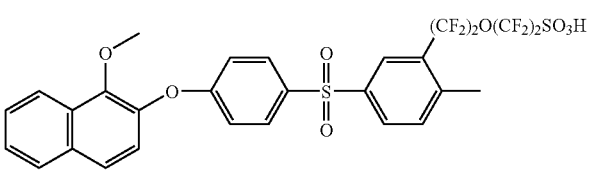
(1-48)
(1-49)

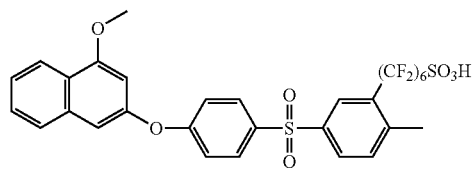
(1-50)

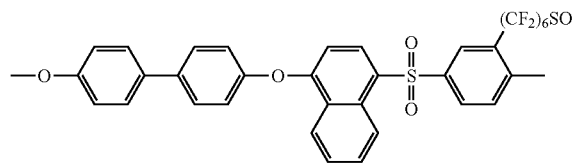
(1-51)

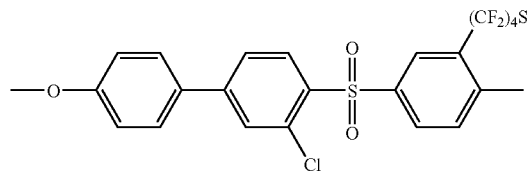
(1-52) (1-53)

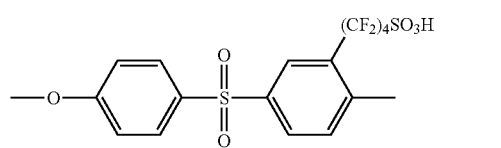
(1-54) (1-55)

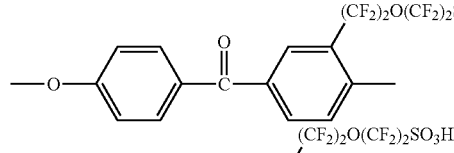
(1-56) (1-57)

(1-58)

While the polymer electrolyte of the invention has a repetitive structure represented by the formula (1), it may be either a copolymer or a block polymer containing other repetitive structure than described above. The repetitive structure other than the repetitive structure represented by the formula (1) includes, for example, those shown by the following formula:

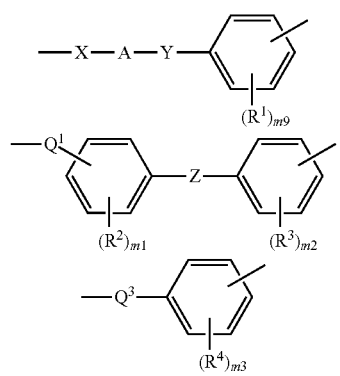

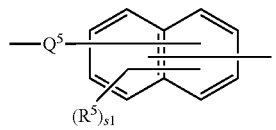

In the formulae, X, A, Y, Z, $Q^1$, $Q^3$, $Q^5$, $R^1$, $R^2$, $R^3$, $R^4$, and $R^5$, m1, m2, and m3, and s1 have the same meanings as those described above and a preferred range also has the same meanings. m9 represents an integer of from 0 to 4.

The ratio of the repetitive structure represented by the formula (1) in the polymer electrolyte of the invention is from 10% to 100%, preferably, from 50% to 100% and, more preferably, from 70% to 100% by weight ratio.

The polymer electrolyte of the invention can be prepared, for example, by the following schemes but it is not restricted to them.

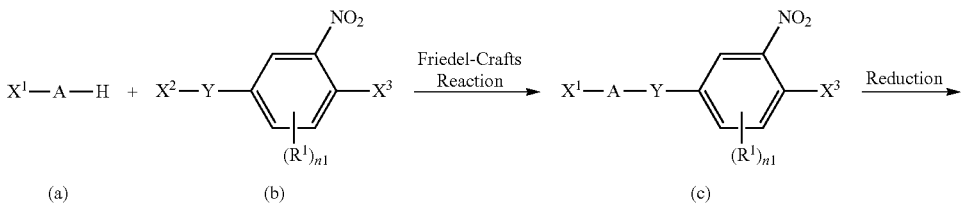

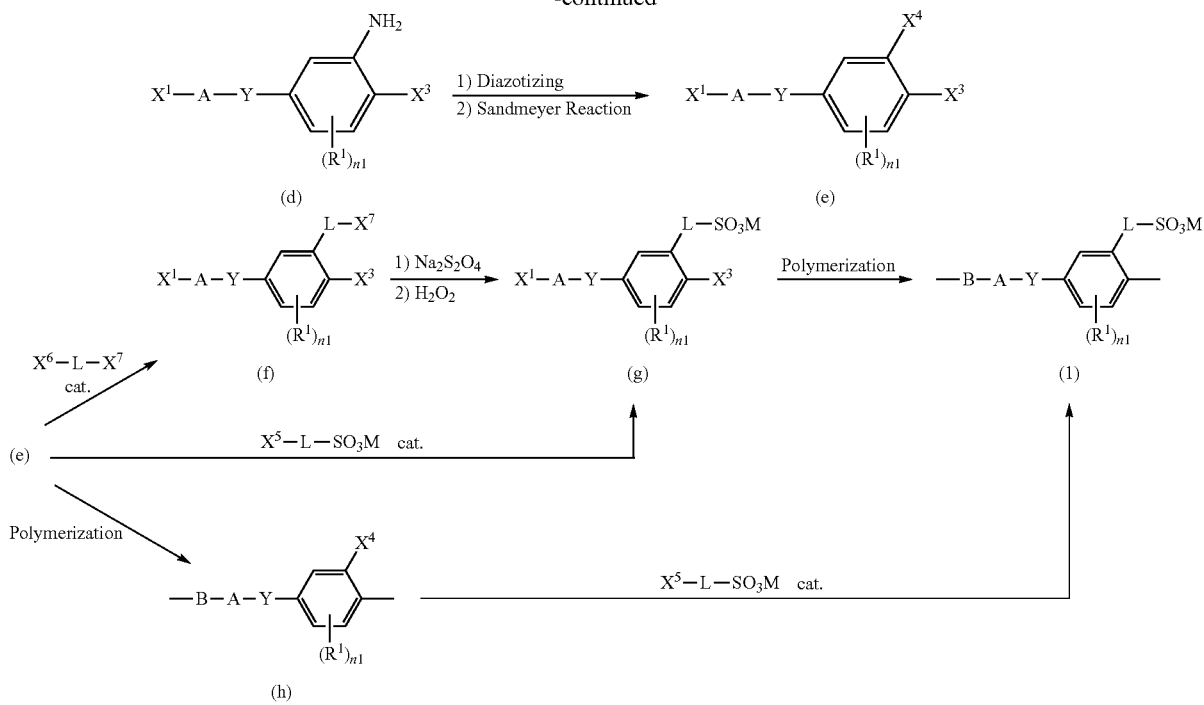

In the formulae, $X^1$ represents a halogen atom (for example, fluorine atom, chlorine atom, bromine atom, or iodine atom, preferably, fluorine atom or chlorine atom), a hydroxyl group or alkoxy group (alkoxy group of 10 or less carbon atoms, preferably, methoxy group). $X^2$ represents a halogen atom (for example, fluorine atom, chlorine atom, bromine atom or iodine atom, preferably, chlorine atom). $X^3$ represents a halogen atom (for example, fluorine atom, chlorine atom, bromine atom or iodine atom, preferably, fluorine atom or and chlorine atom), and a hydroxyl group or alkoxy group (alkoxy group of 10 to less carbon atoms, preferably, methoxy group), or a sulfonyloxy group (preferably, alkylsulfonyloxy group or arylsulfonyloxy group of 10 or less carbon atoms, for example, methansulfonyloxy group, p-toluene sulfonyloxy group, or trifluoromethane sulfonyloxy group). $X^4$ represents a halogen atom (for example, fluorine atom, chlorine atom, bromine atom or iodine atom, preferably, bromine atom or iodine atom). $X^5$ and $X^6$ each represents independently a halogen atom (for example, fluorine atom, chlorine atom, bromine atom, or iodine atom) or a carboxyl group and a salt thereof and represents preferably a bromine atom or iodine atom. $X^7$ represents a halogen atom (for example, fluorine atom, chlorine atom, bromine atom, or iodine atom, preferably, bromine atom or iodine atom). A, B, Y, $R^1$, n1, and L have the same meanings as those described above.

The step of obtaining (c) from (a) and (b) can be attained by a Friedel-Crafts reaction. The reaction may be conducted under the absence of a solvent or under the presence of a solvent. The solvent includes, for example, dichlorobenzene, nitrobenzene, and methylene chloride. As the acid used in the reaction, those used generally for the Friedel-Crafts reaction can be used and includes, for example, aluminum trichloride, aluminum tribromide, gallium tribromide, gallium trichloride, iron trichloride, indium trichloride, antimony pentachloride, tin tetrachloride, titanium tetrachloride, zinc dichloride, hydrogen fluoride, sulfuric acid, phosphoric acid, and perfluorosulfonic acid, preferably, aluminum trichloride and iron trichloride. The reaction is conducted, preferably, at 0 to 200° C. and, more preferably, at 20 to 150° C. While the amount of the acid to be used has no particular restriction, it is used to the reaction substrate, preferably, by from 0.01 to 10.0 molar equivalent, more preferably, from 0.1 to 5.0 molar equivalent.

The step of obtaining (d) from (c) can be attained by a known reduction reaction. The reduction reaction includes, for example, a method of using a metal such as reduced iron or zinc under an acidic condition, a method of using sodium sulfide, sodium hydrosulfide, or sodium dithionite, a reducing method of using a metal catalyst such as platinum, Raney nickel, palladium-carbon, or rhodium-alumina and a hydrogen source such as a hydrogen gas or hydrazine, and a method of using a metal hydride such as LiAlH$_4$. Among the reduction reactions, the method of using the metal under the acidic condition and the reduction method using the metal catalyst and the hydrogen source are preferred. The reaction temperature, while different depending on the reduction method to be used, is generally about from 0 to 200° C.

The reaction of obtaining (e) from (d) can be attained by a diazotizing reaction of an amino group and a Sandmeyer reaction succeeding thereto. For the diazotizing reaction, known reactions can be used. As the nitroso source, generally available reagents such as sodium nitrite or isoamyl nitride is used preferably. While the nitroso source has no particular restriction, it is used, preferably, by from 10 to 100 molar equivalent and, most preferably, by from 1.0 to 10.0 molar equivalent to the reaction substrate. While the solvent has no particular restriction, sulfuric acid, hydrochloric acid, acetic acid, propionic acid, or the like is used preferably. The reaction temperature, while different depending on the reaction conditions, is generally about from −50 to 100° C. For the Sandmeyer reaction, known methods can be used. As the copper compound to be added, cuprous bromide, cupric bromide, cuprous iodide, etc. can be used. Such copper compounds are preferably used, though with no particular restriction, by from 1.0 to 10.0 molar equivalent and, most preferably, by from 1.0 to 5.0 molar equivalent based on the reaction substrate. For the reaction solvent, acetic acid, sulfuric acid, hydrogen halide solution (hydrogen bromide solution, hydrogen iodide solution, etc.) can be used and they may be used in admixture. Among them, it is particularly preferred to conduct the reaction under the presence of the hydrogen halide solution. The reaction is conducted preferably by adding a diazonium salt obtained by the diazotizing reaction in the preceding step to the cupper containing solution. The reaction is preferably conducted about at −50 to 100° C.

The polymer electrolyte of the invention can be produced by a method of obtaining (g) by cross coupling reaction between (e) and $X^5$-L-$SO_3$M and then conducting polymerizing reaction, or a method of conducting polymerization reaction using (e) to obtain a polymer (h) and then putting $X^5$-L-$SO_3$M to cross coupling reaction. Upon introducing sulfonic acid (-L-$SO_3$M) on the side chain, sulfonic acid may also be introduced after once conducting cross coupling reaction between (e) or (h) and $X^6$-L-$X^7$.

The cross coupling reaction between (e) or (h) and $X^5$-L-$SO_3$M or $X^6$-L-$X^7$ can be attained by known methods under the presence of metals. While the reaction may be conducted under the absence of solvent, it is preferably conducted in a solvent. Preferred solvents include, for example, water, sulfoxides (for example, dimethylsulfoxide), ketones (for example, acetone, methylethylketone), esters (for example, ethyl acetate, butyl acetate, and ethyl propionate), ethers (for example, diethylether, dibutylether, and tetrahydrofuran), aliphatic hydrocarbons (for example, pentane and hexane), aromatic hydrocarbons (for example, toluene, xylene, and mesitylene), dinitriles (for example, acetonitrile and propionitrile), amides (for example, N,N-dimethylformamide, N,N-dimethylacetoamide, and N-methylpyrrolidone), carboxylic acids (for example, acetic acid and propionic acid), alcohols (for example, methanol, ethanol, isopropanol, n-butanol, and 3-methylbutanol), and halogen solvents (for example, chloroform, and 1,2-dichloroethane). Among them, sulfoxides (for example, dimethylsulfoxide), amides (for example, N,N-dimethylformamide, N,N-dimethylacetoamide and N-methylpyrrolidone), ethers (for example, diethylether, dibutylether, and tetrahydrofuran), dinitriles (for example, acetonitrile and propionitrile) are more preferred and dimethylsulfoxide, N,N-dimethylformamide, N,N-dimethylacetoamide, and N-methylpyrrolidine are particularly preferred. Preferred metals include, for example, copper, sodium, lithium, potassium, zinc, iron, chromium, nickel, magnesium, and salts thereof. They are more preferably, copper and salts thereof (for example, CuI, CuBr, CuCl, Cu(OH)$_2$, and Cu(OAc)$_2$) and further preferably, copper and CuI. The amount of the metal to the compound represented by $X^5$-L-$SO_3$M or $X^6$-L-$X^7$ is, preferably, from 0.3 to 10 molar equivalent and, more preferably, from 0.5 to 5 molar equivalent. The reaction temperature is preferably from −10 to 250° C. and, more preferably, from 0 to 200° C.

The method of obtaining (f) by the cross coupling reaction between (e) and $X^6$-L-$X^7$ and then transforming —$X^7$ into sulfonic acid includes, for example, a method of reacting sodium dithionite under the presence of a base to form a corresponding sulfinic acid(salt) and then transforming the same by an oxidizing reaction into sulfonic acid(salt).

The amount of sodium dithionite to be used based on the compound represented by (e) is, preferably, from 1.0 to 10 molar equivalent and, more preferably, from 1.0 to 5.0 molar equivalent. The base is preferably sodium hydrogen carbonate. The amount of sodium hydrogen carbonate to be used based on the compound represented by (e) is, preferably, from 1.0 to 10 molar equivalent and, more preferably, from 1.0 to 5.0 molar equivalent amount. The solvent includes those solvents described in the step of the cross coupling reaction described above, a solvent mixture of acetonitrile and water is particularly preferred. The mixing ratio of acetonitrile and water: acetonitrile/water is, preferably, from 1/100 to 100/1 and, more preferably, from 1/1 to 10/1. The reaction temperature is, preferably, from 20° C. to 100° C. and, more preferably, from 40° C. to 80° C.

While oxidation of the sulfinic acid(salt) can be attained by known methods and a preferred method includes a method of using aqueous hydrogen peroxide under the presence of a metal. As the metal, sodium tungstate and potassium tungstate are preferred. The amount of the metal to be used based on the sulfinic acid compound is, preferably, from 0.0010 to 0.20 molar equivalent and, more preferably, from 0.01 to 0.10 molar equivalent. The solvent includes, for example, those solvents described for the step of the cross coupling reaction and it is preferably water. The reaction temperature is, preferably, from 20° C. to 100° C. and, more preferably, 30° C. to 80° C.

The polymerizing reaction for (e) and (g) can be conducted by known methods. For example, in a case where $X^1$ and $X^2$ each represents a halogen atom, a desired polymer electrolyte or a precursor thereof can be obtained for example by the following methods.

(1) By an aromatic nucleophilic substitution reaction between (e) or (g) and Hnu-B'-NuH (Nu=oxygen atom, sulfur atom, etc.), a polymer of —B—=-Nu-B'-Nu- or a precursor thereof in the repetitive structure represented by the formula (1) can be obtained. Specifically, the method described, for example, in the fourth edition, Experimental Chemistry Course 28, edited by Japan Chemical Society, issued from Maruzen Co., Polymer Synthesis p. 190, 356 to 357, etc. can be referred to.

(2) By self coupling of (e) or (g) under the presence of a metal, a polymer of —B—=single bond or a precursor thereof in the repetitive structure represented by the formula (1) can be obtained. Specifically, a method described, for example, in the fourth edition, Experimental Chemistry Course 28, edited by Japan Chemical Society, issued from Maruzen Co., Polymer Synthesis p. 76 to 77, 189 etc. can be referred to.

(3) By the coupling reaction between (e) or (g) and $M_1$-B"-$M_2$ ($M_1$-B"-$M_2$ is an organic metal reaction agent comprising a metal such as Li, Mg, Al, Ga, In, Zn, Zr, B, Si, Sn, and Bi), a polymer of —B—=-Nu-B'-Nu- or a precursor thereof in the repetitive structure represented by the formula (1) can be obtained. Specifically, Journal of Polymer Science, Part A: Polymer Chemistry, 39(10), 1533-1556 (2001) and literatures cited therein can be referred to.

Further, in a case where one of $X^1$ and $X^2$ is a halogen atom, and the other is NuH (Nu=oxygen atom, sulfur atom, etc.) (also including a case where both of $X^1$ and $X^2$ are halogen atoms, in which only one of them is transformed into NuH), a polymer of —B—=-Nu- or a precursor thereof in the repetitive structure represented by the formula (1) can be obtained by the self aromatic nucleophilic substitution reaction of (e) or (g). Specifically, the fourth edition, Experimental Chemistry Course 28, edited by Japan Chemical Society, issued from Maruzen Co., Polymer Synthesis p. 186-188, etc. can be referred to.

The amount of the sulfonic acid groups in the polymer compound obtained as described above based on the repetitive structure constituting the polymer is, preferably, from 0.05 to 2 and, more preferably, from 0.3 to 1.5. By defining the amount to 0.05 or more, the proton conductivity increases more and, on the other hand, by defining the amount to 2 or less, this can more effectively suppress that the hydrophilicity is increased to form a water soluble polymer, or the durability is lowered even when it does not show the water solubility.

Further, the molecular weight of the polymer compound of the invention obtained as described above is, preferably, from 1,000 to 1,000,000 and, more preferably, from 1,500 to 200,000 of average molecular weight (Mw) based on polystyrene. By defining the molecular weight to 1,000 or more, this can effectively prevent insufficiency of film coating property such as occurrence of cracks in the formed film and can more effectively increase the property in view of strength. On the other hand, by defining the molecular weight to 1,000,000, this can more effectively suppress problems that the solubility becomes insufficient, and the viscosity of the solution increases to result in poor fabricability.

The structure of the polymer compound of the invention can be confirmed by IR absorption spectrum as S=O absorption at 1,030 to 1,045 cm$^{-1}$ and 1,160 to 1,190 cm$^{-1}$, C—O—C absorption at 1,130 to 1,250 cm$^{-1}$, C=O absorption at 1,640 to 1,660 cm$^{-1}$, etc. and the compositional ratio thereof can be determined by neutralizing titration or elemental analysis of sulfonic acid. Further, the structure can be confirmed by nuclear magnetic resonance spectrum ($^1$H-NMR) from the peak of an aromatic proton at 6.8 to 8.0 ppm.

Then, the polymer electrolyte of the invention contains the polymer compound described above and inorganic acid such as sulfuric acid or phosphoric acid, an organic acid including carboxylic acid, and appropriate amount of water may also be used together in addition to the polymer compound.

In the film forming step, a liquid in which a polymer compound as the raw material is kept at a temperature higher than the melting point or a liquid formed by dissolving the polymer compound using a solvent is used and the film may be formed by extrusion molding, or may be formed by casting or coating the liquid described above. The operation may be conducted by a film molding machine using rolls such as calendar rolls or cast rolls, or a T die, or by press molding using a press. Further, a stretching step may be added to control the film thickness and improve the film property.

Further, a surface treatment may be applied after the film forming step and a surface roughening treatment, a surface cutting, removing, or coating treatment may be conducted as the surface treatment and they can sometimes improve the close adhesion with an electrode.

The obtained polymer electrolyte has, preferably, a film-like shape and a film thickness is preferably from 10 to 500 µm and, more preferably, from 25 to 150 µm. The polymer electrolyte may be of a film shape in a state as molded, or it may be molded into a bulk and then fabricated into a film by cutting.

The film may also be formed by impregnating the polymer electrolyte of the invention into pores of a porous substrate. The film may also be formed by coating and impregnating a raw material solution on a substrate having pores, or dipping a substrate into a raw material solution and filling the raw material solution into pores. Preferred examples of the substrates having pores include porous polypropylene, porous polytetrafluoroethylene, porous cross-linked heat resistant polyethylene, and porous polyimide.

Other Ingredient of Polymer Electrolyte

To the polymer electrolyte of the invention, anti-oxidants, fibers, fine particles, water absorbents, plasticizers, compatibilizers, etc. may also be added optionally in order to improve the film property. The content of the additives is preferably within a range from 1 to 30 mass % based on the entire amount of the polymer electrolyte.

Preferred examples of the anti-oxidant include compounds of (hindered)phenol, monovalent or bivalent sulfur, trivalent or pentavalent phosphor, benzophenone, benzotriazole, hindered amine, cyanoacrylate, salicylate, and oxalic acid anilide types. Specifically, they include those compounds as described in JP-A Nos. 8-53614, 10-101873, 11-114430, and 2003-151346.

Preferred examples of the fibers include perfluorocarbon fibers, cellulose fibers, glass fibers, polyethylene fibers, etc. and include those fibers as described in JP-A Nos. 10-312815, 2000-231928, 2001-307545, 2003-317748, 2004-63430, and 2004-107461.

Preferred examples of the fine particles comprising those of silica, alumina, titanium oxide, zirconium oxide, etc. and specifically they include fine particles as described in JP-A Nos. 6-111834, 2003-178777, and 2004-217921.

Preferred examples of the water absorbents (hydrophilic substances) include crosslinked polyacrylic acid salt, starch-acrylic acid salt, poval, polyacrylonitrile, carboxymethyl cellulose, polyvinyl pyrrolidone, polyglycol dialkyl ether, polyglycol dialkyl ester, silica gel, synthesis zeolite, alumina gel, titania gel, zirconia gel, and yttria gel and, specifically, they include water absorbents as described in JP-A Nos. 7-135003, 8-20716, and 9-251857.

Preferred examples of the plasticizers include phospholic acid ester compounds, phthalic acid ester compounds, aliphatic-basic acid ester compounds, aliphatic dibasic acid ester compounds, bihydric alcohol ester compounds, oxyacid ester compounds, chlorinated paraffin, alkylnaphthalene compounds, sulfone alkylamide compounds, oligo ethers, carbonates, and aromatic nitrites and, specifically, they include plasticizers as described in JP-A Nos. 2003-197030, 2003-288916, and 2003-317539.

Further, the polymer electrolyte of the invention may also be incorporated with various polymer compounds (1) with an aim of enhancing the mechanical strength of the film and (2) with an aim of increasing the acid concentration in the film. (1) For the purpose of enhancing the mechanical strength, polymer compounds having molecular weight of about 10,000 to 1,000,000 and having good compatibility with the polymer electrolyte of the invention are suitable. For example, perfluorinated polymer, polystyrene, polyethylene glycol, polyoxetane, poly(meth)acrylate, polyether ketone, polyether sulfone and two or more of such polymers are preferred and the content is preferably within a range from 1 to 30 mass % based on the entire portion.

The solubilizing agents have boiling point or sublimation point, preferably, of 250° C. or higher and, more preferably, 300° C. or higher.

(2) For the purpose of increasing the acid concentration, polymer compounds having a protonic acid portion such as perfluoro carbon sulfonic acid polymers typically represented by Nafion, poly (meth)acrylate having phospholic acid groups on the side chains, and sulfonation products of heat resistant aromatic polymers such as sulfonated polyether ether ketone, sulfonated polyether sulfone, sulfonated polysulfone, sulfonated polybenzimidazole, etc. are preferred, and the content is preferably within a range from 1 to 30 mass % based on the entire portion.

The polymer electrolyte of the invention is preferably those having the following various performances as the characteristics.

The ion conductivity, for example, at 25° C., 95% relative humidity is, preferably, 0.005 S/cm or higher and, more preferably, 0.01 S/cm or higher, and further preferably, 0.05 S/cm or higher.

As the strength, for example, the tensile strength is, preferably, 350 kg/cm$^2$ or more and, more preferably, 450 kg/cm$^2$ or more.

As the durability, the fluctuation coefficient of the weight and the ion exchange capacity before and after lapse of time at a constant temperature in 30% aqueous hydrogen peroxide is, preferably, 20% or less and particularly preferably, 10% or less. Further, the volume swelling ratio at a constant temperature in ion exchange water is, preferably, 10% or less and, particularly preferably, 5% or less.

As the hot water resistance, the weight retention ratio of the film after storage for 24 hours in ion exchange water at 100° C. is preferably 95 or more.

The polymer electrolyte of the invention preferably has stable water absorption ratio and water content. Further, the polymer electrolyte having a solubility substantially negligible to alcohols, water and a mixed solvent of them are preferred. Further, the polymer electrolyte also having the reduction of weight and change of form substantially negligible when dipped in the solvent described above is preferred.

It is preferred that the direction of the ion conduction in a case of forming the electrolyte into the film is higher in the direction from the surface to the rear face than that in other directions.

The heat resistant temperature of the polymer electrolyte of the invention is, preferably, from 100° C. or higher, more preferably, 150° C. or higher and, further preferably, 200° C. or higher. The heat resistant temperature can be defined, for example, as a time when weight reduction reaches 5% as it is heated at a rate of 1° C./min. The weight reduction is calculated while excluding the evaporation components such as water content.

Further, in a case of using the polymer electrolyte of the invention for a fuel cell, an active metal catalyst for promoting the redox reaction of an anode fuel and a cathode fuel may be added. By the addition, the fuel permeating into the polymer electrolyte is consumed in the polymer electrolyte without reaching other electrode and crossover can be prevented. While the active metal species to be used have no particular restriction so long as they function as an electrode catalyst, platinum or platinum based alloy is suitable.

Fuel Cell

The polymer electrolyte of the invention can be used for a membrane/electrode assembly (hereinafter referred to as "MEA") and a fuel cell using the membrane and electrode assembly.

FIG. 1 shows an example of a schematic cross sectional view of a membrane and electrode assembly of the invention, an MEA 10 has a film-shape polymer electrolyte 11, and a gas diffusion electrode comprising an anode electrode 12 and a cathode electrode 13 disposed on both sides thereof.

Each of the anode electrode 12 and the cathode electrode 13 is preferably an electrode in which fine particles of a catalyst metal are supported by a binder on the surface of a conductive material comprising a carbon material. Specifically, those comprising porous conductive sheets (for example, carbon paper) 12a, 13a and catalyst layers 12b, 13b are preferred. The catalyst layers 12b, 13b comprise a dispersion formed by dispersing carbon material particles (for example, ketchen black, acetylene black, or carbon nanotube) supporting the catalyst metal such as platinum particles in a proton conductive material (for example, Nafion). For adhering the catalyst layers 12b, 13b to the polymer electrolyte 11, it is generally used a method of press-bonding the porous conductive sheets 12a, 13a coated with the catalyst layers 12b, 13b to the polymer electrolyte 11 by hot pressing (preferably at 120 to 130° C., 2 to 100 kg/cm$^2$) or press-bonding catalyst layers 12b, 13b coated on an appropriate support while transferring to a polymer electrolyte 11 and then sandwiching the same between porous conductive sheets 12a, 13a.

Figure 2:
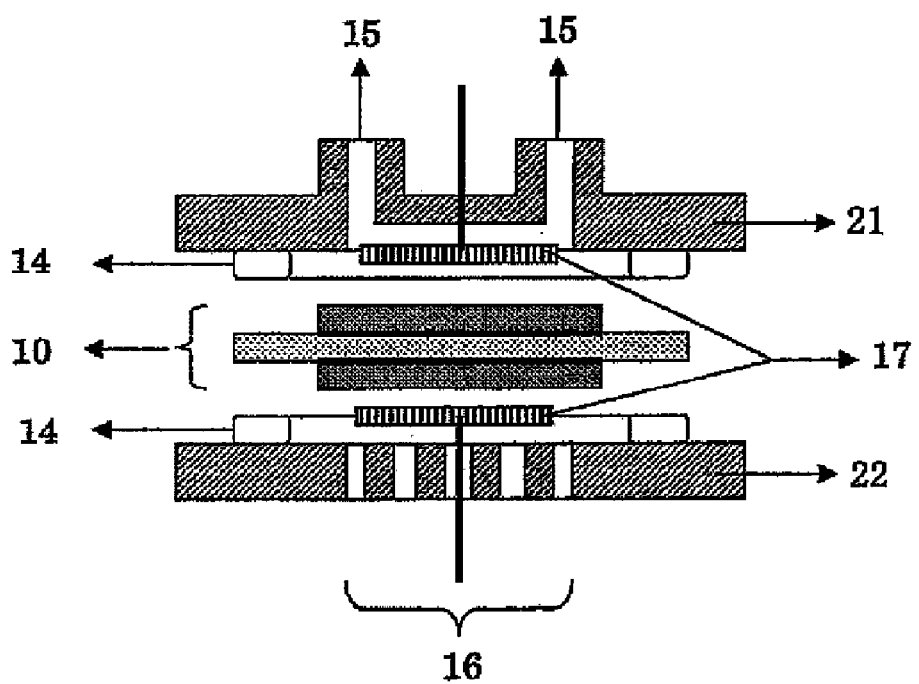
FIG. 2 is a schematic cross sectional view showing a structure of a fuel cell according to the invention.

FIG. 2 shows an example of a fuel cell structure. The fuel cell has an MEA 10, a pair of separators 21, 22 sandwiching the MEA 10, and collectors 17 comprising stainless steels net and packings 14 attached to the separators 21, 22 respectively. The separator 21 on the side of the anode electrode has an anode electrode side opening 25, and the separator 22 on the side of the cathode electrode has a cathode electrode side opening 16. A gas fuel such as hydrogen or alcohols (methanol, etc.) or a liquid fuel such as aqueous alcohol solution is supplied from the anode electrode side opening 15, while an oxidizing gas such as an oxygen gas or air is supplied from the cathode electrode side opening 16.

For the anode electrode and the cathode electrode, a catalyst formed by supporting active metal particles such as platinum on a carbon material is used. The particle size of the active metal used usually is within a range from 2 to 10 nm. As the particle size is smaller, it is advantageous since the surface area per unit mass increases to increase the activity but it is difficult to disperse the particle with no agglomeration in a case where the size is excessively small and it is said that the limit is at about 2 nm.

The activity polarization in the hydrogen-oxygen type fuel cell is larger on the cathode electrode (air electrode) compared with that on the anode electrode (hydrogen electrode). This is because the reaction on the cathode electrode (reaction of oxygen) is slower compared with that on the anode electrode. With an aim of improving the activity of the oxygen electrode, various platinum based binary metals such as Pt—Cr, Pt—Ni, Pt—Co, Pt—Cu, and Pt—Fe can be used preferably. In a direct methanol fuel cell of using an aqueous methanol solution for the anode fuel, it is important to suppress the catalyst poisoning due to CO evolved in the oxidizing process of methanol. For this purpose, platinum-based binary metals such as Pt—Ru, Pt—Fe, Pt—Ni, Pt—Co, and Pt—Mo, and platinum-based ternary metals such as Pt—Ru—Mo, Pt—Ru—W, Pt—Ru—Co, Pt—Ru—Fe, Pt—Ru—Ni, Pt—Ru—Cu, Pt—Ru—Sn, and Pt—Ru—Au can be used preferably.

As the carbon material for supporting the active metal, acetylene black, Vulcan XC-72, ketchen black, carbon nanohorn (CNH), and carbon nanotube (CNT) are used preferably.

The function of the catalyst layer is to (1) transport a fuel to an active metal, (2) provide a reaction sites for the oxidation (anode electrode), and reduction (cathode electrode) of the fuel, (3) transfer electrons generated by redox reaction to a collector and (4) transport protons formed by the reaction to a polymer electrolyte. It is necessary for the catalyst layer that the layer is porous for allowing liquid and gas fuels to permeate deeply for (1). The active metal catalyst described above serves for (2) and the carbon material described above also serves for (3). For attaining the function (4), a proton conductive material is mixed in the catalyst layer.

The proton conductive material, that is, the binder of the catalyst layer has no particular restriction so long as it is a solid material having proton donating groups, and the material includes films of polymer compounds having acid residual groups used for solid electrolytes, hydrocarbon type polymer electrolytes, perfluoro carbon sulfonic acid polymers typically represented by Nafion (registered trade name), poly(meth)acrylate having phosphoric acid groups on the side chains, heat resistant aromatic polymers such as sulfonated polyether ether ketone, sulfonated polyether ketone, sulfonated polyether sulfone, sulfonated polysulfone, and sulfonated polybenzimidazole, sulfonated polystyrene, sulfonated polyoxetane, sulfonated polyimide, sulfonated polyphenylene sulfide, sulfonated polyphenylene oxide, and sulfonated polyphenylene, and include specifically those described in JP-A Nos. 2002-110174, 2002-105200, 2004-10677, 2003-132908, 2004-179154, 2004-175997, 2004-247182, 2003-147074, 2004-234931, 2002-289222, and 2003-208816. When the solid electrolyte of the invention is used for the catalyst layer, since this is a material identical with the solid electrolyte, electrochemical adhesion between the solid electrolyte and the catalyst layer is enhanced to provide more advantages.

The amount of the active metal to be used is suitably within a range from 0.03 to 10 mg/cm$^2$ in view of the cell power and from the economical point of view. The amount of the carbon material for supporting the active metal is suitably from 1 to 10 times the mass of the active metal. The amount of the proton conductive material is suitably from 0.1 to 0.7 times the mass of the active metal supporting carbon.

The member is also referred to as an electrode substrate, permeation layer, or backing material and has a function of preventing worsening of the collection function and permeation of gas caused by water deposition. Usually, carbon paper or carbon cloth is used and those applied with a polytetrafluoroethylene (PTFE) treated may also be used for providing water repellency.

For the manufacture of the MEA, the following four methods are preferred.

(1) Proton conductive material coating method: a catalyst paste (ink) comprising an active metal-carrying carbon material, a proton conductive material, and a solvent as a basic element is directly coated on both sides of a polymer electrolyte, to which porous conductive sheets are (hot) press bonded, to manufacture an MEA of 5-layered structure.

(2) Porous conductive sheet coating method: a catalyst paste is coated on the surface of a porous conductive sheet, to form a catalyst layer which is press-bonded with a polymer electrolyte to manufacture an MEA of 5-layered structure.

(3) Decal method: A catalyst paste is coated on PTFE to form a catalyst layer, then only the catalyst layer is transferred to a polymer electrolyte to form a 3-layered MEA, to which porous conductive sheets are press-bonded to manufacture an MEA of 5-layered structure.

(4) Catalyst post-supporting method: After coating an ink formed by mixing a not platinum supporting catalyst material together with a proton conductive material on a polymer electrolyte, porous conductive sheet, or PTFE to form a film, platinum ions are impregnated into the polymer electrolyte and platinum particles are precipitated by reduction in the film to form a catalyst layer. After forming the catalyst layer, an MEA is manufactured by the methods (1) to (3) above.

Those that can be used as the fuel of a fuel cell using the polymer electrolyte of the invention include hydrogen, alcohols (methanol, isopropanol, ethylene glycol, etc.), ethers (dimethylether, dimethoxymethane, trimethoxymethane, etc.), formic acid, boron hydride complex, ascorbic acid, etc. as the anode fuel. The cathode fuel includes, for example, oxygen (also including oxygen in atmospheric air) and hydrogen peroxide.

In a direct methanol type fuel cell, an aqueous methanol solution at a methanol concentration of from 3 to 64 mass % is used as the anode fuel. According to the anode reaction scheme ($CH_3OH+H_2O \rightarrow CO_2+6H^++6e$), one mol of water is necessary for one mol of methanol in which the methanol concentration corresponds to 64 mass %. As the methanol concentration is higher, it provides a merit capable of decreasing the mass and the volume of the cell including a fuel tank for an identical energy capacity. However, as the methanol concentration is higher, a so-called crossover phenomenon that methanol permeates through the polymer electrolyte and reacts with oxygen on the cathode side to lower the voltage becomes conspicuous, tending to lower the power. Then, the optimal concentration is determined depending on the methanol diffusibility in the polymer electrolyte to be used. The cathode reaction scheme in the direct methanol type fuel cell is: ($3/2O_2+6H^++6e \rightarrow H_2O$), and oxygen (usually oxygen in air) is used as the fuel.

The method of supplying the anode fuel and the cathode fuel to the respective catalyst layers include two types, that is, (1) a method of compulsorily circulating them by using an auxiliary equipment such as a pump (active type) and (2) a method of not using the auxiliary equipment (passive type, for example, by capillary phenomenon or spontaneous falling in a case of liquid and exposing the catalyst layer to atmospheric air in a case of a gas) and they may be also combined. The former has a merit capable of using methanol at high concentration as the fuel by circulating water generated on the cathode side to increase the power by air supply, whereas it involves a drawback that the reduction of the size is difficult because of the provision of a fuel supply system. The latter has an advantage capable of decreasing the size but involves a problem that high power cannot be obtained easily since the fuel supply constitutes a rate-determining factor.

Since the unit cell voltage in the fuel cell is generally 1 V or lower, unit cells are used being stacked in series conforming the voltage necessary for a load. As the method of stacking, "planar stacking" of arranging unit cells on a plane and "bipolar stacking" of stacking separators each having fuel flow channels formed on both side by way of a separator are used. In the former, since the cathode electrode (air electrode) is exposed to the surface, air can be intaken easily and the thickness can be reduced, so that this is suitable to a small-sized fuel cell. In addition, it has also been proposed a method of stacking by applying an MEMS technique and applying fine fabrication on a silicon wafer.

While various uses may be considered for fuel cells such as automobile, domestic and portable equipment application, the direct methanol type fuel cell can be expected particularly for various mobile equipments or portable equipments taking advantage that the reduction of size and weight is possible and charging is not necessary. Mobile equipments applicable preferably include, for example, mobile telephones, mobile notebook personal computers, electronic still cameras, PDAs, video cameras, mobile game machines, mobile servers, wearable personal computers, and mobile displays. Preferably applicable portable equipments include portable electric power generators, outdoor illumination equipments, electric torches, motor-assisted bicycles, etc. The fuel cell can also be used preferably as power sources for industrial or domestic robots or other toys. Further, the fuel cell is also useful as a charging power source for a secondary battery mounted on such equipments.

EXAMPLE

The present invention is to be described further specifically with reference to examples. Materials, amounts of use, ratios, contents of treatment, and procedures of treatment shown in the following examples can be properly changed unless they do not depart from the gist of the invention. Accordingly, the scope of the invention is not restricted to specific examples shown below.

Example 1

A polymer electrolyte (P-1) having a repetitive structure shown by a specific example (1-20) for repetitive unit shown by the formula (1) was synthesized in accordance with the following scheme.

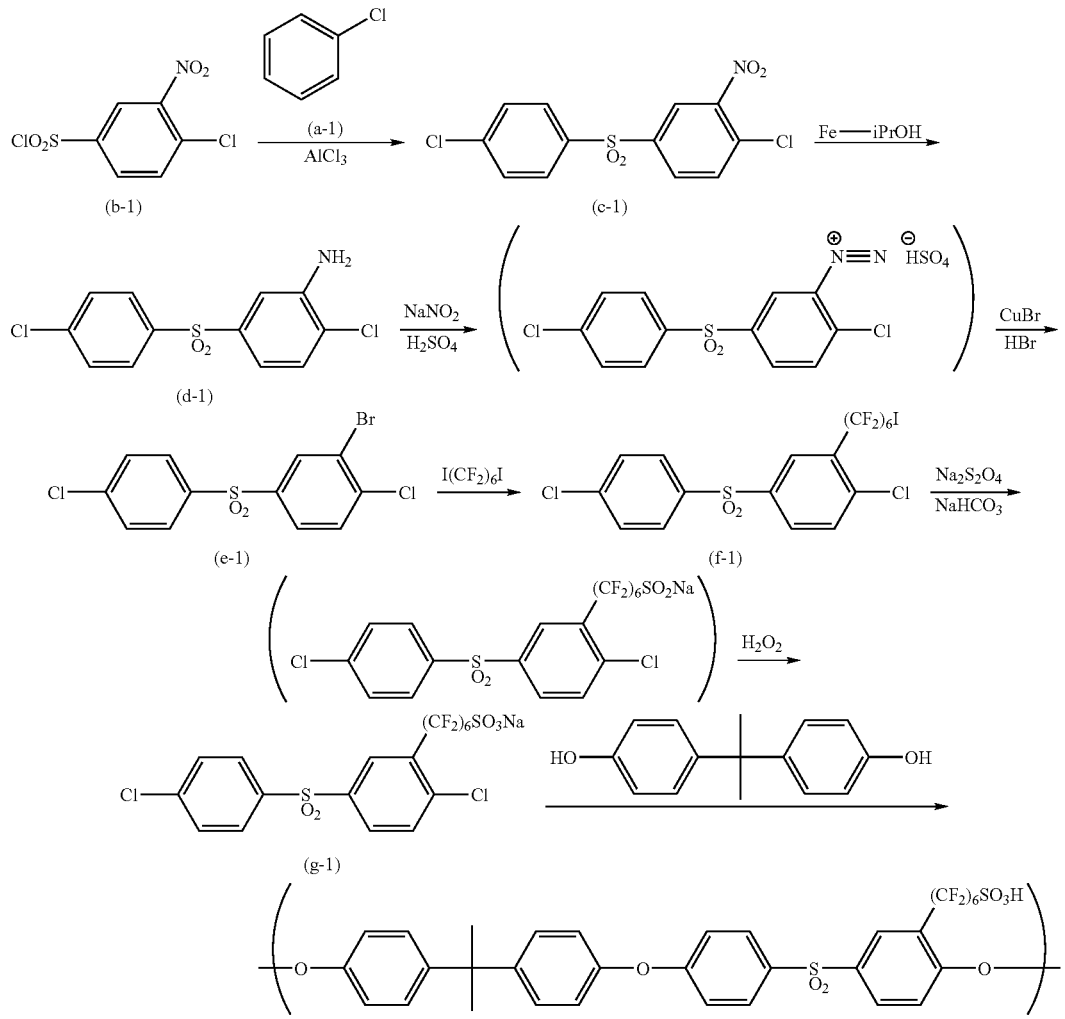

Synthesis of Compound (c-1)

4-chloro-3-nitrobenzene sulfonyl chloride (b-1) (76.8 g, 300 mmol) was dissolved in 200 mL of chlorobenzene (a-1) and heated at 80° C. Aluminum trichloride (60.0 g, 450 mmol) was added portion wise to the reaction solution for 1.5 hours. After heating for further 1.5 hours at 80° C., it was allowed to cool. The reaction solution was extracted with an ethyl acetate-water mixture and the obtained organic phase was concentrated to solidify. 200 mL of isopropanol was added to the solidification product, and the solid was dissolved under reflux and allowed to cool slowly. The precipitated solids were isolated by filtration and dried to obtain 76.7 g of a compound (c-1) (231 mmol, 77% yield).

$^1$H NMR (300 MHz, solvent deuterated DMSO), δ 7.75 (dm, J=9.0 Hz, 2H), 8.04 (d. J=8.4 Hz, 1H), 8.08 (dm, J=9.0 Hz, 2H), 8.27 (dd, J=8.4 Hz, 2.1 Hz, 1H), 8.69 (d, J=2.1 Hz, 1H)

DMSO shows dimethylsulfoxide.

Synthesis of Compound (d-1)

Reduced iron (90.0 g, 1620 mmol), ammonium chloride (9.6 g, 180 mmol), 600 mL of isopropanol and 60 mL of water were heated to an external temperature of 80° C. for 0.5 hours. Then, the compound (c-1) (60.0 g, 180 mmol) was added portionwise for 2 hours and, further heated at 80° C. for 2 hours. When the reaction solution was filtered by using celite and the obtained organic solution was concentrated, it was solidified. 200 mL of isopropanol was added to the solidification product, and the solid was dissolved under reflux and allowed to cool slowly. The precipitated solid was isolated by a filtration and dried to obtain 53.4 g (176.7 mmol, 98% yield) of the compound (d-1).

$^1$H NMR (300 MHz, solvent, deuterated DMSO) δ 5.96 (s, 1H), 7.02 (dd, J=8.1 Hz, 1.8 Hz, 1H), 7.33 (d, J=1.8 Hz, 1H), 7.42 (d, J=8.1 Hz, 1H), 7.70 (d, J=8.7 Hz, 1H), 7.89 (d, J=8.7 Hz, 1H)

Synthesis of Compound (e-1)

The compound (d-1) (50 g, 165 mmol) was dissolved in 250 mL of concentrated sulfuric acid and 200 mL of acetic acid. The solution was dropped under ice cooling to a mixed solution of 125 mL of concentrated sulfuric acid and 23 g of sodium nitrite (330 mmol). After the completion of dropping, they were stirred at a room temperature for one hour. By the procedure, the compound (d-1) was completely eliminated and a corresponding diazonium salt was synthesized. Then, a sulfuric solution containing the compound prepared as described above was dropped portionwise for 2 hours under ice cooling to 330 mmol of cuprous bromide and 500 mL of an aqueous 48% hydrogen bromide solution. Then, they were heated at an external temperature of 60° C. for one hour and then allowed to cool. The solution was added to 4.5 L of water and the obtained crystals were collected and dried to obtain 54.2 g (148 mmol, 90% yield) of a compound (e-1).

$^1$H NMR (400 MHz, solvent deuterated DMSO) δ 7.72 (dm, J=8.8 Hz, 2H), 7.89 (d, J=8.4 Hz, 1H), 7.98 (dd, J=8.1 Hz, 2.0 Hz, 1H), 8.06 (dm, J=8.8 Hz, 2H), 8.35 (d, J=2.0 Hz, 1H)

Synthesis of Compound (f-1)

The compound (e-1) (18.3 g, 50 mmol), and I(CF$_2$)$_6$I (83 g, 150 mmol) were added to 100 mL of DMSO, and 6.4 g (100 mmol) of a copper powder was added in a nitrogen atmosphere. Then, they were heated at an external temperature of 130° C. for 3 hours and, after being allowed to cool, ethyl acetate and 1N hydrochloric acid were added. The solution was filtered by using celite, the filtrate was separated, the obtained organic phase was washed with water and dried over magnesium sulfate. After concentration at a reduced pressure, column chromatographic purification was conducted using silica gel as a filler, and hexane containing 10 vol % of ethyl acetate as an eluate. As a result, 22.7 g of crude solid containing the compound (f-1) was obtained.

$^1$H, NMR (300 MHz, solvent deuterated DMSO), δ 7.73 (d, J=8.7 Hz, 2H), 8.08 (d, J=8.4 Hz, 1H), 8.12 (d, J=8.7 Hz, 2H), 8.18 (d, J=1.8 Hz, 1H), 6.36 (dd, J=8.4 Hz, 1.8 Hz, 1H), $^{19}$F NMR (282 MHz, solvent deuterated DMSO) δ-123.05 (s, 2F), −121.63 (s, 2F), −120.75 (s, 2F), −113.93 (s, 2F), −106.73 (t, J=14.1 Hz, 2F), −68.59 (s, 2F).

Synthesis of Compound (g-1)

A mixed solution of 10 g of a solid containing the compound (f-1) obtained as described above, 4.87 g (28 mmol) of NA$_2$S$_2$O$_4$, 100 mL of acetonitrile, and 20 mL of water were heated at an external temperature of 70° C. 1.26 g (15 mmol) of sodium hydrogen carbonate was added portionwise for 10 min to the solution. After being allowed to cool, the reaction solution was extracted in an ethyl acetate-water mixture and the obtained organic phase was concentrated. The obtained organic material was dissolved in ethyl acetate and column chromatographic purification was conducted by using a silica gel as a filler, and ethyl acetate containing 25 vol % of isopropanol as an eluate. As a result, 5.67 g (8.34 mmol) of corresponding sodium sulfinate was obtained.

$^1$H NMR (300 MHz, solvent deuterated DMSO), δ 7.75 (d, J=8.7 Hz, 2H), 8.03 (d, J=8.4 Hz, 1H), 8.09 (d, J=8.7 Hz, 2H), 8.18 (d, J=1.8 HZ, 1H), 8.32 (dd, J=8.4 Hz, 1.8 Hz, 1H), $^{19}$F NMR (282 MHz, solvent deuterated DMSO), δ-130.41 (m, 2F), −122.55 (s, 2F), −121.81 (s, 2F), 121.47 (s, 2F), −119.88 (s, 2F), −106.67 (t, J=13.8 Hz, 2F)

Sodium sulfinate obtained as described above (5.0 g, 7.5 mmol), and 0.1 g (0.30 mmol) of sodium tungstate dihydrate were dissolved in 10 mL of water. The solution was heated to 50° C., 3.0 mL (26.4 mmol) of aqueous hydrogen peroxide (30%) was added and stirred for one hour. After completion of the reaction, sodium sulfite was added till iodine-starch test paper was no more colored with iodine, the reaction solution was extracted with an ethyl acetate-water mixture and obtained organic phase was concentrated. The obtained organic matter was dissolved in ethyl acetate and column chromatographic purification was conducted by using silica gel as a filler and ethyl acetate as an eluate. As a result, 2.27 g (3.29 mmol, 44% yield) of a compound (g-1) was obtained.

When the purity was measured by using HPLC, it was 98.6% (measuring wavelength at 254 nm).

$^1$H NMR (300 MHz, solvent deuterated DMSO) δ7.73 (dm, J=8.7 Hz, 2H), 8.02 (d, J=8.7 Hz, 1H), 8.08 (dm, J=8.7 Hz, 2H), 8.18 (d, J=2.4 Hz, 1H), 8.32 (dd, J=8.7 Hz, 2.4 Hz, 1H)

$^{19}$F NMR (282 MHz, solvent deuterated DMSO) δ-121.40 (m, 4F), −120.39 (m, 2F), −119.87 (m, 2F), −114.59 (m, 2F), −106.52 (m, 2F)

Polycondensation of Compound (g-1) and Bisphenol

The compound (g-1) (0.3446 g, 0.500 mmol), bisphenol (0.1142 g, 0.500 mmol), and potassium carbonate (0.104 g, 0.750 mmol) were added to 5 mL of N-methylpiperidone and 5 mL of toluene and heated at an external temperature of 130° C. for 2 hours and a micro-amount of water present in the reaction system was removed by Dean-Stark. Then, they were heated at an external temperature of 195° C. for 20 hours. After allowing to cool, it was extracted with ethylacetate-water mixture and an obtained organic phase was concentrated, to obtain an amorphous polymer. After dissolving the polymer in N,N-dimethylacetoamide, an aqueous 5N hydrochloric acid was added to precipitate a polymer which is separated by filtration and water washed and dried to obtain a polymer electrolyte (0.25 g) having a repetitive structure shown by (1-20). As a result of measurement for a molecular weight by GPC measurement using DMAc as a developing solvent, mass average molecular weight Mn=61,500 and weight average molecular weight Mw=104,000 (based on polystyrene).

$^1$H NMR (300 MHz, solvent deuterated DMSO) δ 1.68 (s, 6H), 7.01-7.15 (m, 7H), 7.30-7.39 (m, 4H), 7.95-8.15 (m, 2H), 8.18-8.20 (m, 2H)

$^{19}$F NMR (282 MHz, solvent deuterated DMSO) δ-121.41 (brs, 4F), −120.65 (brs, 2F), −120.46 (brs, 2F), −114.55 (bros, 2F), −107.32 (brs, 2F)

Example 2

By the same procedures as described above, a polymer electrolyte (P-2) having the repetitive structure shown by a specific example (1-14) of the repetitive unit shown by the formula (1) was synthesized. The polymer electrolyte (P-2) had Mn=85,500, and Mw=125,000.

Example 3

By the same procedures as described above, a polymer electrolyte (P-3) having the repetitive structure shown by a specific example (1-17) of the repetitive unit shown by the formula (1) was synthesized. The polymer electrolyte (P-3) had Mn=72,500, and Mw=118,000.

Characteristics of the polymer electrolytes (P-1) to (P-3) obtained in Examples 1 to 3 are shown in Table 1.

TABLE 1

|  | Example 1 | Example 2 | Example 3 | Comp. Example*[4] |
|---|---|---|---|---|
| Sulfonic acid group molar equivalent*[1] (meq/1) | 1.2 | 1.4 | 1.3 | 1.1 |
| Proton conductivity*[2] (S/cm) | 0.057 | 0.064 | 0.061 | 0.037 |

TABLE 1-continued

|  | Example 1 | Example 2 | Example 3 | Comp. Example*[4] |
|---|---|---|---|---|
| Hot water resistance*[3] (%) | 98 | 97 | 99 | 95 |

*[1]The sulfonic acid group molar equivalent was determined by a neutralizing titration method in tetrahydrofuran (THF)/water with NaOH (indicator: phenolphthalein)
*[2]The proton conductivity was determined by an AC method in accordance with a method described in JP-A No. 2005-255789 under the condition at a temperature of 80° C. and a humidity of 90%.
*[3]Hot water resistance was determined as a weight retention ratio after 24 hours in ion exchange water at 100° C. in accordance with the method as described in JP-A No. 2005-255789.
*[4]Polymer electrolyte synthesized by the method described in Example 2 of JP-A No. 2005-314452 was used.

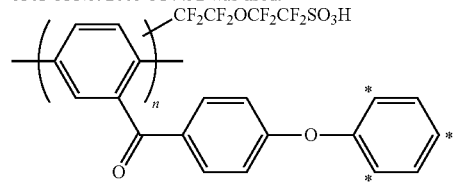

As apparent from Table 1, it was confirmed that the polymer electrolyte of the invention has higher proton conductivity compared with the existent polymer electrolyte and is excellent also in the hot water resistance compared with existent polymer electrolytes and useful as a proton conduction film for use in a fuel cell.

While the present invention has been described in detail and with reference to specific embodiments thereof, it will be apparent to one skilled in the art that various changes and modifications can be made therein without departing from the spirit and scope thereof.

The present disclosure relates to the subject matter contained in Japanese Patent Application No. 098697/2006 filed on Mar. 31, 2006, which is expressly incorporated herein by reference in its entirety. All the publications referred to in the present specification are also expressly incorporated herein by reference in their entirety.

The foregoing description of preferred embodiments of the invention has been presented for purposes of illustration and description, and is not intended to be exhaustive or to limit the invention to the precise form disclosed. The description was selected to best explain the principles of the invention and their practical application to enable others skilled in the art to best utilize the invention in various embodiments and various modifications as are suited to the particular use contemplated. It is intended that the scope of the invention not be limited by the specification, but be defined claims set forth below.

What is claimed is:

1. A polymer electrolyte having a repetitive structure represented by the following formula (1):

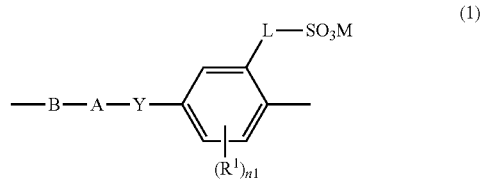

wherein B represents an oxygen atom, a sulfur atom or a bivalent group selected from the group consisting of the following formulas $(B_1)$, $(B_2)$ and $(B_3)$, A represents a bivalent aromatic group, Y represents $-SO_2-$, $-SO-$ or $-CO-$, $R^1$ in formula (1) and $R^2$, $R^3$, $R^4$ and $R^5$ in formulas $(B_1)$, $(B_2)$ and $(B_3)$ each independently represents a halogen atom, an alkyl group of 20 or less carbon atoms, an aryl group of 30 or less carbon atoms, a cyano group, a carboxyl group, an alkoxycarbonyl group of 20 or less carbon atoms, an aryloxycarbonyl group of 30 or less carbon atoms, a carbamoyl group, an alkylcarbonyl group of 20 or less carbon atoms, an arylcarbonyl group of 30 or less carbon atoms, a nitro group, an amino group, an acylamino group of 20 or less carbon atoms, a sulfoneamide group, an imide group, an imino group, a hydroxyl group, an alkoxy group of 20 or less carbon atoms, an aryloxy group of 30 or less carbon atoms, an acyloxy group of 20 or less carbon atoms, an alkylsulfonyloxy group of 20 or less carbon atoms, an arylsulfonyloxy group of 30 or less carbon atoms, a sulfo group, a sulfamoyl group, an alkylthio group of 20 or less carbon atoms, an arylthio group of 30 or less carbon atoms, an alkylsulfonyl group of 20 or less carbon atoms, an arylsulfonyl group of 30 or less carbon atoms, or a heterocyclic group, n1 represents, 0, 1, 2 or 3, L represents a perfluoroalkylene group, and M represents an ionic group,

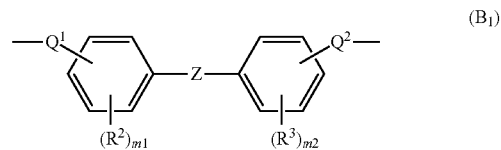

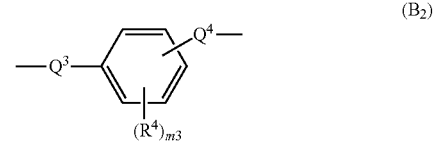

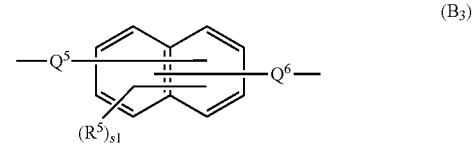

wherein Z represents a single bond or a bivalent group, $Q^1$, $Q^2$, $Q^3$, $Q^4$, $Q^5$, and $Q^6$ each represents independently a single bond, an oxygen atom or a sulfur atom, $R^2$, $R^3$, $R^4$ and $R^5$ are as defined above, m1, m2 and m3 each represents independently 0, 1, 2, 3 or 4, and s1 represents 0, 1, 2, 3, 4, 5 or 6.

2. The polymer electrolyte according to claim 1, wherein in the formula (1), A represents a bivalent aromatic group selected from the group consisting of the following formulae $(A_1)$ and $(A_2)$:

-continued

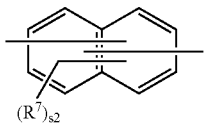
(A₂)

wherein $R^6$ and $R^7$ each represents independently a halogen atom, an alkyl group of 20 or less carbon atoms, an aryl group of 30 or less carbon atoms, a cyano group, a carboxyl group, an alkoxycarbonyl group of 20 or less carbon atoms, an aryloxycarbonyl group of 30 or less carbon atoms, a carbamoyl group, an alkylcarbonyl group of 20 or less carbon atoms, an arylcarbonyl group of 30 or less carbon atoms, a nitro group, an amino group, an acylamino group of 20 or less carbon atoms, a sulfoneamide group, an imide group, an imino group, a hydroxyl group, an alkoxy group of 20 or less carbon atoms, an aryloxy group of 30 or less carbon atoms, an acyloxy group of 20 or less carbon atoms, an alkylsulfonyloxy group of 20 or less carbon atoms, an arylsulfonyloxy group of 30 or less carbon atoms, a sulfo group, a sulfamoyl group, an alkylthio group of 20 or less carbon atoms, an arylthio group of 30 or less carbon atoms, an alkylsulfonyl group of 20 or less carbon atoms, an arylsulfonyl group of 30 or less carbon atoms, or a heterocyclic group, m4 represents, 0, 1, 2, 3 or 4, and s2 represents 0, 1, 2, 3, 4, 5 or 6.

3. The polymer electrolyte according to claim 1, wherein in the formula (1), L is a perfluoroalkylene group having an etheric bond.

4. The polymer electrolyte according to claim 1, which is in the form of a film.

5. A membrane/electrode assembly comprising a polymer electrolyte of claim 4, and a gas diffusion electrode including a cathode electrode and an anode electrode disposed on both sides of the polymer electrolyte film.

6. The membrane/electrode assembly according to claim 5, wherein the gas diffusion electrode is an electrode in which fine particles of a catalyst metal are supported by a binder on the surface of a conductive material made of a carbon material.

7. The membrane/electrode assembly according to claim 6, wherein the binder is a hydrocarbon polymer electrolyte.

8. A fuel cell comprising the membrane/electrode assembly of claim 5.

9. The fuel cell according to claim 8, further comprising a pair of gas impermeable separators disposed so as to sandwich the gas diffusion electrode therebetween.

10. The fuel cell according to claim 9, further comprising a pair of collectors disposed between the polymer electrolyte membrane and the separator.

* * * * *